US012699780B1

(12) United States Patent
Manuelian et al.

(10) Patent No.: US 12,699,780 B1
(45) Date of Patent: Aug. 4, 2026

(54) VULNERABILITY MANAGEMENT VIA A GRAPHICAL INTERFACE

(71) Applicant: RapidFort, Inc., Sunnyvale, CA (US)

(72) Inventors: George Manuelian, Atherton, CA (US); Evgueni Iskrenov Hadjev, Los Altos, CA (US); Russell Joseph Pelletier Andersson, San Francisco, CA (US); Chien-Hung Chen, Tainan City (TW)

(73) Assignee: RapidFort, Inc., Sunnyvale, CA (US)

( * ) Notice: Subject to any disclaimer, the term of this patent is extended or adjusted under 35 U.S.C. 154(b) by 0 days.

(21) Appl. No.: 19/564,845

(22) Filed: Mar. 12, 2026

Related U.S. Application Data

(60) Provisional application No. 63/771,993, filed on Mar. 14, 2025.

(51) Int. Cl.
G06F 21/57 (2013.01)
G06F 3/04842 (2022.01)

(52) U.S. Cl.
CPC ........ G06F 21/577 (2013.01); G06F 3/04842 (2013.01)

(58) Field of Classification Search
CPC ............................ G06F 21/577; G06F 3/04842
See application file for complete search history.

(56) References Cited

U.S. PATENT DOCUMENTS

| | | |
|---|---|---|
| 8,984,643 B1 | 3/2015 | Krisher et al. |
| 10,454,935 B2 | 10/2019 | Parimi et al. |

(Continued)

FOREIGN PATENT DOCUMENTS

| | | |
|---|---|---|
| CN | 111971658 B | 8/2021 |
| CN | 116186712 A | 5/2023 |

(Continued)

OTHER PUBLICATIONS

International Search Report and Written Opinion for International Application No. PCT/US2026/018917 dated Jun. 24, 2026.

*Primary Examiner* — Anh Nguyen
(74) *Attorney, Agent, or Firm* — Young Basile Hanlon & MacFarlane, P.C.

(57) ABSTRACT

A computing machine displays a first interface region including indications of original software blocks and corresponding original vulnerability metrics, and a second interface region including subregions respectively associated with the original software blocks, each subregion presenting selectable compatible replacement software blocks and associated replacement vulnerability metrics. The computing machine presents aggregate vulnerability metrics including a first aggregate metric representing a count of vulnerabilities across the original software blocks and a second aggregate metric representing a count of vulnerabilities across indicated replacement software blocks. The computing machine receives a user selection of replacement software blocks for a selected subregion and responsively updates the associated replacement vulnerability metrics and the second aggregate metric to reflect vulnerabilities of the selected replacement software blocks. The computing machine displays a severity breakdown of vulnerabilities associated with at least one of the first aggregate metric or the second aggregate metric.

30 Claims, 6 Drawing Sheets

(56)     References Cited

U.S. PATENT DOCUMENTS

| | | | |
|---|---|---|---|
| 10,778,713 | B2 | 9/2020 | Zeng et al. |
| 11,750,657 | B2 | 9/2023 | Hadar et al. |
| 2014/0173737 | A1* | 6/2014 | Toback .................. G06F 21/57 |
| | | | 726/25 |
| 2019/0079734 | A1 | 3/2019 | Kadam et al. |
| 2020/0204468 | A1 | 6/2020 | Nickolov et al. |
| 2020/0242254 | A1 | 7/2020 | Velur et al. |
| 2022/0027465 | A1* | 1/2022 | Hercock ............. G06N 3/0499 |
| 2022/0284096 | A1 | 9/2022 | Gadhe |
| 2023/0033317 | A1 | 2/2023 | Lin et al. |
| 2023/0359744 | A1 | 11/2023 | Duggan et al. |
| 2023/0359745 | A1 | 11/2023 | Kilgallon et al. |
| 2024/0171614 | A1 | 5/2024 | Crabtree et al. |
| 2024/0411895 | A1 | 12/2024 | Dubey et al. |
| 2025/0306567 | A1* | 10/2025 | Anthony ............. G06F 11/3698 |

FOREIGN PATENT DOCUMENTS

| | | | |
|---|---|---|---|
| EP | 3654220 | A1 | 5/2020 |
| EP | 3997653 | A1 | 5/2022 |
| WO | 2024241287 | A2 | 11/2024 |

* cited by examiner

| CURRENT STATE 302 | | PROPOSED REPLACEMENT STATE 304 | |
| --- | --- | --- | --- |
| NAME | VULERABILITIES | NAME | VULERABILITIES |
| CURRENT TOTAL | 155 | REPLACEMENT TOTAL | 12 |
| ABC-1 | 93 | ABC-2 | 0 |
| DEF-1 | 37 | DEF-2 | 2 |
| GHI-1 | 25 | GHI-2 | 10 |
| CRITICAL | 23 | CRITICAL | 0 |
| HIGH | 70 | HIGH | 0 |
| MEDIUM | 47 | MEDIUM | 7 |
| LOW | 15 | LOW | 5 |

*400*

| IDENTIFY SOFTWARE BLOCKS WITHIN A SOFTWARE APPLICATION | *402* |

| GENERATE A SBOM | *404* |

| IDENTIFY AVAILABLE MODIFICATIONS FOR THE SOFTWARE APPLICATION | *406* |

| CALCULATE INDIVIDUAL VULNERABILITY COUNTS | *408* |

| DETERMINE PROJECTED VULNERABILITY COUNTS | *410* |

| GENERATE A VULNERABILITY REDUCTION PREDICTION | *412* |

| PRESENT THE VULNERABILITY REDUCTION PREDICTION | *414* |

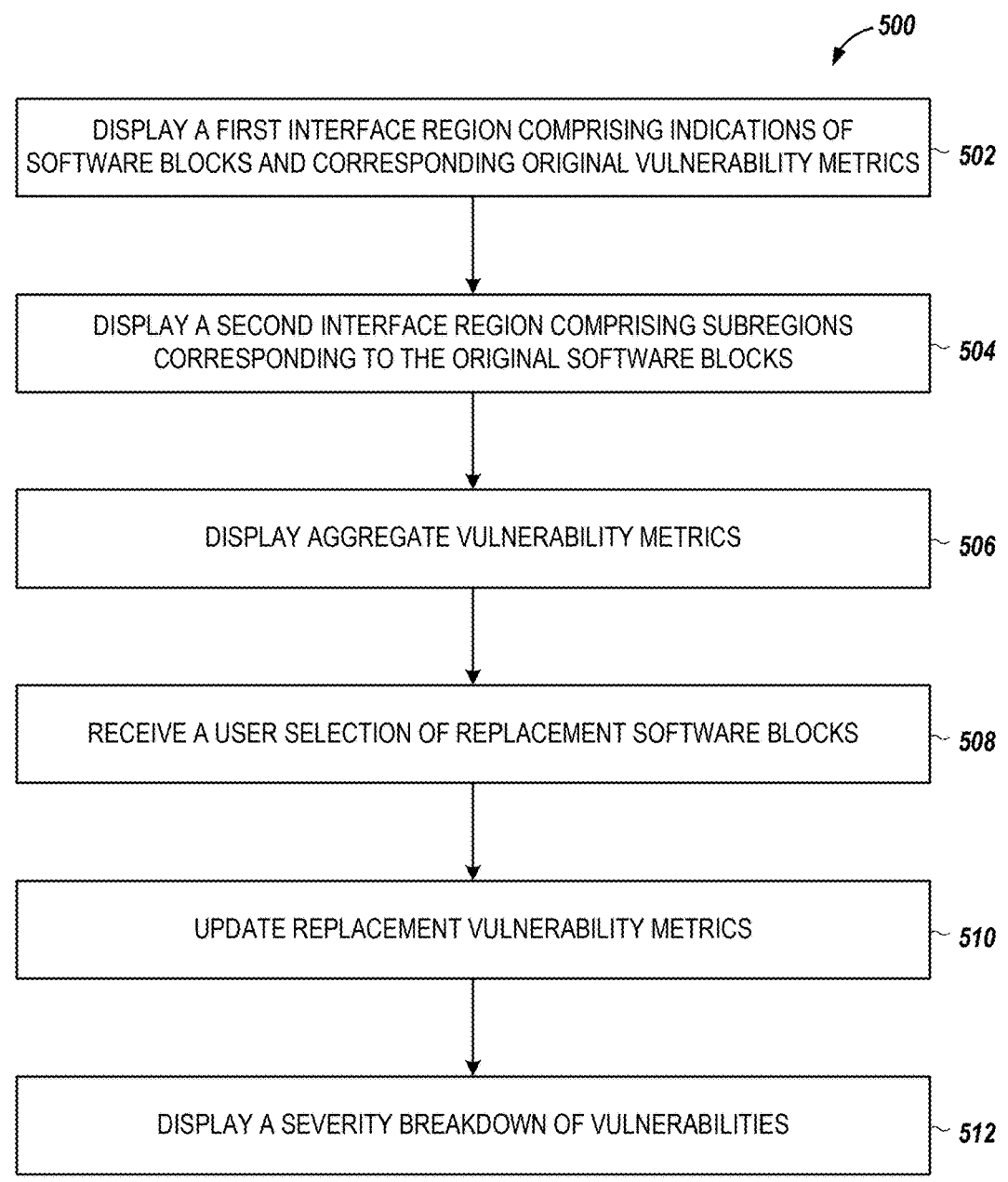

*500*

DISPLAY A FIRST INTERFACE REGION COMPRISING INDICATIONS OF SOFTWARE BLOCKS AND CORRESPONDING ORIGINAL VULNERABILITY METRICS ⌐ *502*

DISPLAY A SECOND INTERFACE REGION COMPRISING SUBREGIONS CORRESPONDING TO THE ORIGINAL SOFTWARE BLOCKS ⌐ *504*

DISPLAY AGGREGATE VULNERABILITY METRICS ⌐ *506*

RECEIVE A USER SELECTION OF REPLACEMENT SOFTWARE BLOCKS ⌐ *508*

UPDATE REPLACEMENT VULNERABILITY METRICS ⌐ *510*

DISPLAY A SEVERITY BREAKDOWN OF VULNERABILITIES ⌐ *512*

ORIGINAL IMAGES 602

606 | MAPPED IMAGES 604

608

VULNERABILITIES: 510
CRITICAL: 23
HIGH: 75
MEDIUM: 195
LOW: 217

VULNERABILITIES: 189
CRITICAL: 9
HIGH: 19
MEDIUM: 115
LOW: 46

| NAME | VULERABILITIES | NAME | VULERABILITIES |
|---|---|---|---|
| WORDPRESS:LATEST | 182 | ORIGINAL | 182 |
| PYTHON:3.11 | 121 | PYTHON.3.11.6-FOC | 0 |
| NGINX:LATEST | 99 | NGINX:1.28.2-SLIM | 0 |
| REDIS:LATEST | 83 | REDIS:7.3.8-FOCAL | 0 |
| ETCD:V3.6.18 | 25 | ETCD:3.6-CURATED | 7 |

*FIG. 6*

VULNERABILITY MANAGEMENT VIA A GRAPHICAL INTERFACE

PRIORITY CLAIM

This application claims priority to U.S. Provisional Patent Application No. 63/771,993, filed on Mar. 14, 2025, and titled "Providing Computer Security Through Vulnerability Management," the entirety of which is incorporated herein by reference.

TECHNICAL FIELD

Embodiments pertain to computer architecture. Some embodiments relate to computer security. Some embodiments relate to providing computer security through vulnerability management.

BACKGROUND

Some enterprise software applications face significant security challenges due to the complexity and time-intensive nature of vulnerability management. More efficient techniques for vulnerability management may be desirable.

BRIEF DESCRIPTION OF THE DRAWINGS

FIG. 5 is a flow chart of an example of a technique for vulnerability management via a user interface, in accordance with some embodiments.

FIG. 6 illustrates an example of a graphical user interface for providing computer security, in accordance with some embodiments.

DETAILED DESCRIPTION

Figure 1:
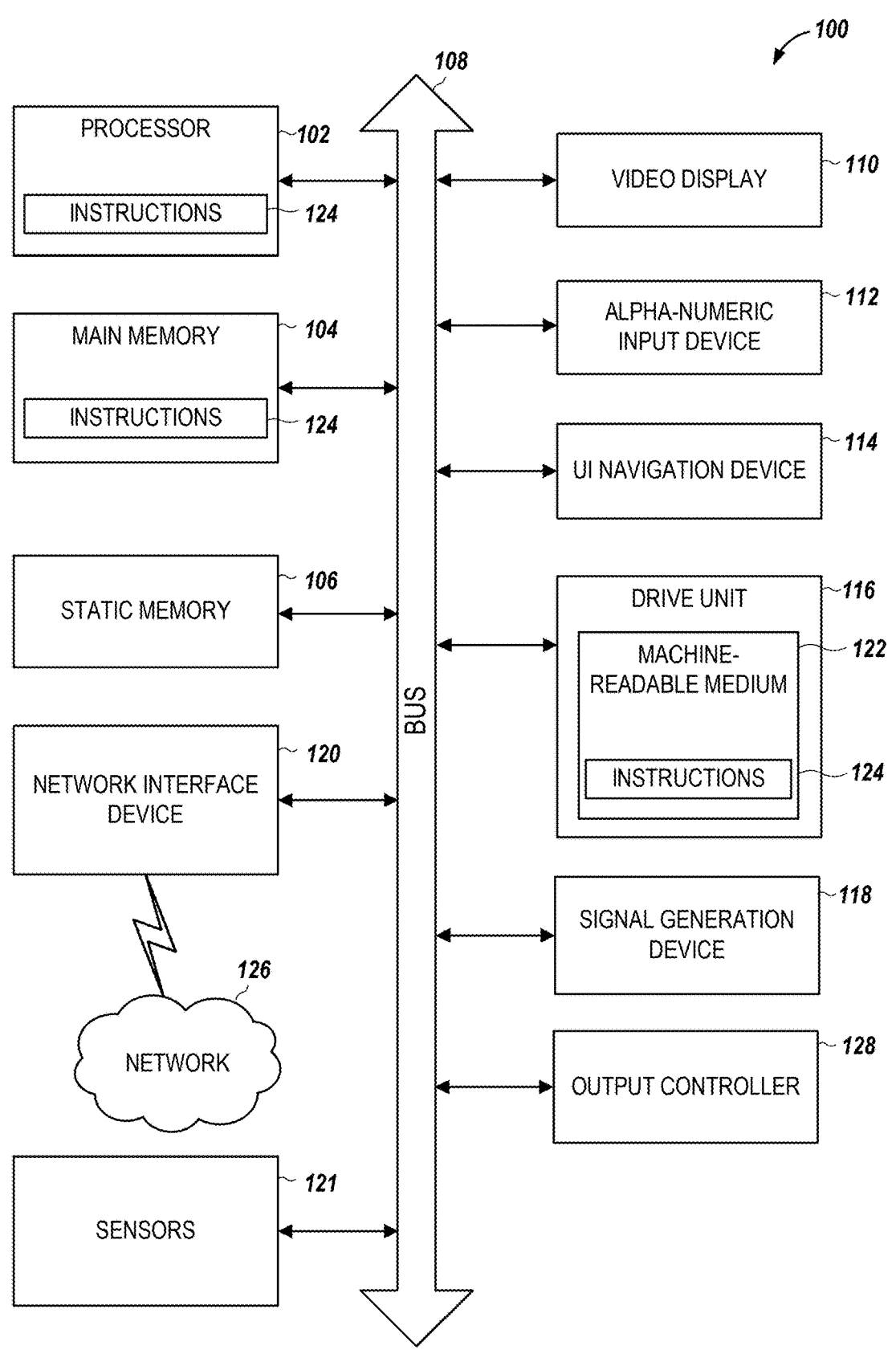
FIG. 1 is a block diagram of an example computing machine, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As set forth above, some enterprise software applications face significant security challenges due to the complexity and time-intensive nature of vulnerability management. The process of identifying, analyzing, and addressing Common Vulnerabilities and Exposures (CVEs) across numerous software components and dependencies requires substantial manual effort and resources. Organizations struggling to maintain security compliance with frameworks like National Institute of Standards and Technology (NIST) Zero Trust Software Architecture (ZTSA) lack efficient, automated techniques to evaluate and implement potential security improvements through patching, leading to delayed remediation and increased risk exposure.

Some implementations of the disclosed technology provide an automated approach to vulnerability management through a multi-module architecture that integrates image scanning technology (e.g., container, virtual machine, or package image scanning technology) with comprehensive Software Bill of Materials (SBOM) generation. The system may automatically scan all or a portion of the software blocks within an application, catalog executable code and dependencies, and maintain historical version data while searching available software repositories for fixed versions that address known vulnerabilities.

Some implementations may employ a predictive engine that analyzes current CVE counts against potential patches, calculating projected security improvements based on patch implementation scenarios. Through an interactive user interface, the system presents developers with actionable insights including before/after CVE counts and version-specific patch selection options, enabling informed decision-making for security hardening while significantly reducing the manual effort required for vulnerability management. Some implementations may integrate seamlessly with NIST ZTSA schemes while providing quantifiable metrics for security improvement through patching.

Some techniques described herein align with NIST ZTSA requirements by facilitating automated vulnerability management through systematic software analysis. In some implementations, the system may generate a Runtime Bill of Materials (RBOM) as an alternative to the SBOM. The RBOM captures actual dependencies and relationships observed during runtime execution of the software application, providing additional insights beyond static analysis. This runtime-based approach may identify dependencies that are only manifested during actual execution of the software components, potentially revealing vulnerabilities that might not be evident through static analysis alone. In some examples, the runtime-based approach may reveal that certain dependencies or relationships reported by static analysis do not actually exist during typical execution of the software application. In some implementations, static analysis may produce an overstated result by including possible dependencies and relationships across all possible execution scenarios, whereas the runtime-based approach produces a more representative result by capturing the dependencies and relationships that are exercised during typical execution scenarios covered by a user-provided coverage script. Accordingly, the runtime-based approach may, in some cases, reduce false positives in vulnerability reporting by excluding dependencies and relationships that, while theoretically possible, are not exercised during actual runtime execution. In some implementations, the system implements a comprehensive five-step process for vulnerability management: (1) scanning some or all software used by the application, (2) building an SBOM or RBOM, (3) searching for existing fixed versions of the software indexed in the SBOM or RBOM, (4) recalculating the CVE count based on the new projected SBOM or RBOM with updated patched software, and (5) presenting the results in a human-readable format or user interface to give developers options for selecting specific versions of the patched software.

In some implementations, the system utilizes container image scanning technology as a technique for identifying software components within applications. The container image scanning technology performs detailed analysis of containerized applications, examining layer by layer to identify installed packages, binaries, libraries, and dependencies. This scanning process provides a foundation for a comprehensive software component inventory and a subsequent vulnerability analysis, enabling thorough examination of both explicitly declared dependencies and implicitly required components.

Some implementations include a dedicated CVE prediction engine that analyzes current vulnerability states against potential patches. This specialized engine maintains a database (or other data store) of known patches and their effects, correlating specific patches with particular CVE resolutions. Through this correlation mechanism, the system can predict vulnerability remediation outcomes for each potential patch implementation scenario. The CVE prediction engine leverages version control integration to track changes in software components over time, enabling historical vulnerability trend analysis and supporting decision-making around patch implementation timelines. In some implementations, the CVE prediction engine is configured to receive, as input, one or more identifiers corresponding to respective software blocks, each identifier uniquely specifying a particular version of a particular software block. Based on the received one or more identifiers, the CVE prediction engine generates, as output, a list of potential patch implementation scenarios and, for each potential patch implementation scenario, a corresponding predicted vulnerability remediation outcome. Each potential patch implementation scenario may include application of one or more candidate patches or version upgrades to the identified software blocks, and each corresponding predicted vulnerability remediation outcome may include one or more projected vulnerability counts, severity breakdowns, or other vulnerability metrics associated with the scenario. The CVE prediction engine may further leverage version control integration to track changes in software components over time, enabling historical vulnerability trend analysis and supporting decision-making around patch implementation timelines.

In some implementations, the system facilitates the hardening of applications (e.g., enterprise applications) through efficient vulnerability management. As used herein, the term "hardening" encompasses its plain and ordinary meaning in the field of computer security, referring to the process of securing an application or a computer system by reducing its surface of vulnerability through the identification and remediation of security weaknesses, implementation of security patches, removal of unnecessary software, services, and features, and configuration of security policies that enhance the application's or the computer system's resistance to attacks. Enterprise applications often face unique security challenges due to their scale, complexity, and critical business functions. In some implementations, the vulnerability management approach described herein addresses these challenges by providing streamlined, automated processes for identifying and remediating security vulnerabilities. This enterprise-focused methodology supports organizations in maintaining strong security postures while minimizing resource expenditure on security improvements.

As used herein, the term "application" encompasses its plain and ordinary meaning. An application may include a collection of program(s) and/or data that provide a desired functionality in a computing environment. The term "application" may refer to the functionality which the collection of program(s) and/or data provide. The term "application" may refer to the collection of program and/or data files which comprise the contents of an application image. The term "application image" may refer to a packaged file (or another data structure) comprising those contents.

As used herein, the terms "application image" or "application image file" encompass their plain and ordinary meaning. The "application image" or "application image file" may refer to an image file including a collection of program(s) and/or data that provide a desired functionality when instantiated in a computing environment.

As used herein, the term "static analysis" encompasses its plain and ordinary meaning in the field of software analysis. Static analysis refers to the examination and evaluation of software code or application images without executing the program, typically performed on the source code, object code, binaries, or application packages in their inactive state (at rest). Static analysis methods may include, for example and without limitation: inspection of object file headers to identify required libraries or programs; analysis of unresolved and exported symbols within object files or binaries; identification of package dependency information from metadata; examination of import/export tables; parsing of configuration files to determine potential component relationships; and code flow analysis to determine potential execution paths. Static analysis contrasts with dynamic analysis, which examines software during runtime execution. When used in the context of identifying potential use-based dependencies, static analysis determines relationships that may exist based on the structure and content of the software, rather than relationships observed during actual execution.

As used herein, the term "software block" encompasses its plain and ordinary meaning in the field of software engineering and refers to a discrete, identifiable component of software that serves a specific function or purpose within a larger software application or system. A software block may include, but is not limited to, executable binaries, libraries, packages, modules, containers, virtual machines, microservices, functions, classes, or any other logically separated software component that can be individually analyzed, modified, or replaced. In some implementations, a software block corresponds to a software package, such as a RedHat Package Manager (RPM) package, a Debian (DEB) package, an Android Package Kit (APK), or another distributable package format, and a software application (e.g., a container image or a virtual machine image) may include one or more such packages. In these implementations, the package serves as the unit of vulnerability analysis. Software blocks may have dependencies on other software blocks, including package-level dependencies, creating relationship networks that affect functionality and security. Each software block typically has associated metadata including version information. In addition, a software block may include at least one of origin data or other package-level information. In some cases, the metadata of a software block may include vulnerability information. In other cases, the metadata of a software block lacks vulnerability information. Because vulnerabilities are generally discovered after a software block has been released and distributed, the metadata as originally published typically does not reflect subsequently identified vulnerabilities. Although a developer may update the metadata of a previously released version to include vulnerability information after a vulnerability is discovered, in practice, developers typically release a new version of the software block that addresses the vulnerability rather than modifying the metadata of existing versions. Accordingly, known vulnerabilities associated with a software block are typically determined during package analysis (e.g., by consulting a vulnerability data repository) rather than by inspecting the metadata of the software block itself. In the context of vulnerability management, a software block represents a unit of analysis for which security vulnerabilities can be identified, assessed, and remediated through available modifications such as patches or version upgrades.

Aspects of the present technology may be implemented as part of a computer system. The computer system may be one physical machine, or may be distributed among multiple physical machines, such as by role or function, or by process thread in the case of a cloud computing distributed model. In various embodiments, aspects of the technology may be configured to run in virtual machines that in turn are executed on one or more physical machines. It will be understood by persons of skill in the art that features of the technology may be realized by a variety of different suitable machine implementations.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The system includes various engines, each of which is constructed, programmed, configured, or otherwise adapted, to carry out a function or set of functions. The term engine as used herein may include a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software, the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

This document may reference a specific number of things (e.g., "six mobile devices"). Unless explicitly set forth otherwise, the numbers provided are examples only and may be replaced with any positive integer, integer or real number, as would make sense for a given situation. For example, "six mobile devices" may, in alternative embodiments, include any positive integer number of mobile devices. Unless otherwise mentioned, an object referred to in singular form (e.g., "a computer" or "the computer") may include one or multiple objects (e.g., "the computer" may refer to one or multiple computers).

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium. For example, a computer-readable medium may include at least one of a compact disc (CD), a digital versatile/video disc (DVD), or a Blu-ray disc (BD). The CD, DVD, or BD may be at least one of read-only memory (ROM) or read-write (RW). For example, a computer-readable medium may include at least one of (1) optical discs (e.g., CD-ROM, DVD-ROM, Blu-Ray, MiniDisc, or the like) (2) magnetic disks (e.g., floppy disks, ZIP disks, or the like) (3) magneto-optical discs (MO disk, or the like) (4) memory cards (e.g., at least one of secure digital (SD) cards, MultiMediaCard (MMC) cards, CompactFlash (CF) cards, Memory Stick (MS) cards, USB flash drives, or the like; the memory cards can be read-only or read/writeable) (5) ROM cartridges, or (6) magnetic tapes (e.g., cassette tapes, reel tapes, digital audio tapes (DAT), linear tape-open (LTO) tapes, or the like). In some examples, a computer-readable medium includes circuitry to connect to the computer through a peripheral interface (e.g., at least one of universal asynchronous receiver/transmitter (UART), Institute of Electrical and Electronics Engineers (IEEE) 1284, parallel advanced technology attachment (PATA), serial advanced technology attachment (SATA), universal serial bus (USB), Institute of Electrical and Electronics Engineers (IEEE) 1394, small computer systems interface (SCSI), or the like), in order to cause the computer to read the computer-readable medium. In some examples, the computer-readable medium (e.g., an optical disc or a magnetic disc) lacks circuitry to connect to the computer. In some examples, the computer includes at least one of a peripheral interface, a driver, a software interface, or a hardware interface for reading the computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

FIG. 1 illustrates a circuit block diagram of a computing machine 100 in accordance with some embodiments. In some embodiments, components of the computing machine 100 may store or be integrated into other components shown in the circuit block diagram of FIG. 1. For example, portions of the computing machine 100 may reside in the processor 102 and may be referred to as "processing circuitry." Processing circuitry may include processing hardware, for example, one or more central processing units (CPUs), one or more graphics processing units (GPUs), and the like. In alternative embodiments, the computing machine 100 may operate as a standalone device or may be connected (e.g., networked) to other computers. In a networked deployment, the computing machine 100 may operate in the capacity of a server, a client, or both in server-client network environments. In an example, the computing machine 100 may act as a peer machine in peer-to-peer (P2P) (or other distributed) network environment. In this document, the phrases P2P, device-to-device (D2D) and sidelink may be used interchangeably. The computing machine 100 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 100 may include a hardware processor 102 (e.g., a central processing unit (CPU), a GPU, a hardware processor core, or any combination thereof), a main memory 104 and a static memory 106, some or all of which may communicate with each other via an interlink (e.g., bus) 108. Although not shown, the main memory 104 may contain any or all of removable storage and non-removable storage, volatile memory or non-volatile memory. The computing machine 100 may further include a video display unit 110 (or other display unit), an alphanumeric input device 112 (e.g., a keyboard), and a user interface (UI) navigation device 114 (e.g., a mouse). In an example, the display unit 110, input device 112 and UI navigation device 114 may be a touch screen display. The computing machine 100 may additionally include a storage device (e.g., drive unit 116), a signal generation device 118 (e.g., a speaker), a network interface device 120, and one or more sensors 121, such as a global positioning system (GPS) sensor, compass, accelerometer, or other sensor. The computing machine 100 may include an output controller 128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 116 (e.g., a storage device) may include a machine readable medium 122 on which is stored one or more sets of data structures or instructions 124 (e.g., software) embodying or utilized by any one or more of the techniques or functions described herein. The instructions 124 may also reside, completely or at least partially, within the main memory 104, within static memory 106, or within the hardware processor 102 during execution thereof by the computing machine 100. In an example, one or any combination of the hardware processor 102, the main memory 104, the static memory 106, or the drive unit 116 may constitute machine readable media.

While the machine readable medium 122 is illustrated as a single medium, the term "machine readable medium" may include a single medium or multiple media (e.g., a centralized or distributed database, and/or associated caches and servers) configured to store the one or more instructions 124.

The term "machine readable medium" may include any medium that is capable of storing, encoding, or carrying instructions for execution by the computing machine 100 and that cause the computing machine 100 to perform any one or more of the techniques of the present disclosure, or that is capable of storing, encoding or carrying data structures used by or associated with such instructions. Nonlimiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 124 may further be transmitted or received over a communications network 126 using a transmission medium via the network interface device 120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 120 may include one or more physical jacks (e.g., Ethernet, coaxial, or phone jacks) or one or more antennas to connect to the communications network 126.

Figure 2:
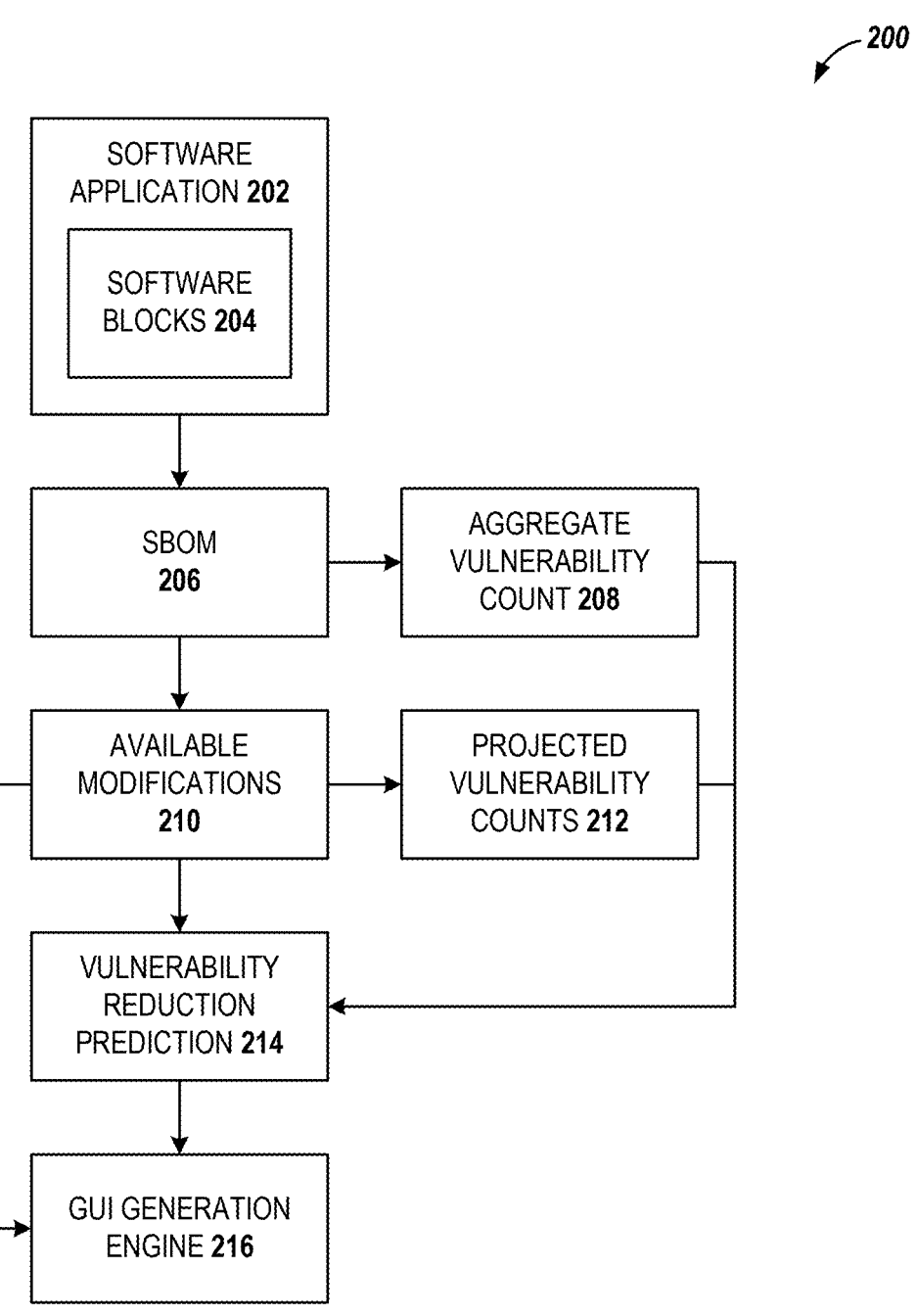
FIG. 2 is a block diagram of an example of a system for providing computer security through vulnerability management, in accordance with some embodiments.

FIG. 2 is a block diagram of an example of a system 200 for providing computer security through vulnerability management, in accordance with some embodiments. The system 200 may be stored in a memory subsystem of one or more computing machines (e.g., the computing machine 100). The memory subsystem may include at least one of the main memory 104, the static memory 106, or the drive unit 116. Alternatively, one or more of the components of the system 200 may be hard-wired into processing circuitry (e.g., the processor 102).

As shown, the system 200 includes a software application 202, which comprises software blocks 204, with each of the software blocks 204 being a component of the software application 202. The software blocks 204 within the software application 202 may be identified through automated image scanning.

The system 200 generates a SBOM 206 based on the software blocks 204. The SBOM 206 includes metadata tags for the software blocks and a data structure mapping relationships between the software blocks 204. At least one of the metadata tags is applied to at least a first subset of the software blocks 204. A metadata tag may correspond to one or more than one software block of the software blocks 204. A software block of the software blocks 204 may have zero, one, or more than one metadata tags. Also, while the plural term "software blocks" is used to refer to the software blocks 204, the software blocks 204 may include only a single software block or multiple software blocks. The system 200 calculates, using the SBOM 206, an aggregate vulnerability count 208 associated with a current state of the software application 202. In some implementations, each version of each software block of at least a subset of the software blocks has a corresponding vulnerability metric that is specific to that software block and version. The vulnerability metric may comprise vulnerability counts categorized by severity level, including Critical, High, Medium, Low, and Unknown severity levels. For a given version of a given software block, an aggregate vulnerability count may be defined as a sum of the vulnerability counts across the severity levels associated with that version of that software block. In some implementations, a vulnerability metric for the software application 202 is determined as a sum of the vulnerability metrics of its constituent software blocks, and the aggregate vulnerability count 208 for the software application 202 is determined as a sum of the aggregate vulnerability counts of the constituent software blocks.

The system 200 identifies (e.g., by querying one or more databases or other data repositories) available modifications 210 (e.g., patches) for the software application 202 corresponding to the SBOM 206. In some implementations, identifying the available modifications 210 comprises querying one or more vulnerability databases (e.g., a CVE database) and/or software repositories to obtain information indicating, for each vulnerability, at least one of an affected software block, one or more affected versions of the software block, or one or more fixed versions of the software block. Using this information, for at least one software block of the software blocks 204 in the software application 202 that has one or more associated vulnerabilities, the system 200 determines whether one or more fixed versions are available and, if so, identifies versions that remediate the one or more vulnerabilities. In some implementations, for at least one such software block having one or more vulnerabilities and one or more corresponding fixed versions, the system 200 identifies candidate replacement versions including the fixed version and, optionally, subsequent versions released after the fixed version. The available modifications 210 may comprise combinations of selected candidate replacement versions for the respective software blocks having one or more vulnerabilities and one or more corresponding fixed versions, such that each available modification represents a potential patch implementation scenario. While the plural term "available modifications" is used, the available modifications 210 may include one modification or more than one modifications. The available modifications are identified based on the metadata tags and compatibility with the mapped relationships. The system 200 calculates one or more individual vulnerability counts for at least a second subset of the software blocks 204 and the aggregate vulnerability count 208 associated with the current state of the software application 202.

The system 200 determines projected vulnerability counts 212 based on various vulnerability remediations by the available modifications 210. There may be a single projected vulnerability count or multiple projected vulnerability counts in the projected vulnerability counts 212. In some implementations, a respective projected vulnerability count is determined for each of the available modifications 210, such that each available modification corresponds to one projected vulnerability count. The projected vulnerability counts 212 may be determined through automated analysis of modification implementation impacts on the mapped relationships. In some implementations, a projected vulnerability count corresponding to a given available modification is calculated using a same methodology as that used to calculate the aggregate vulnerability count for the current state of the software application 202, except that, for each software block replaced by the given available modification, the vulnerability metric associated with the replacement version of the software block is used in place of the vulnerability metric associated with the original version of the software block.

The system 200 generates a vulnerability reduction prediction 214 based on a comparison of the aggregate vulnerability count 208 and the projected vulnerability counts 212. The vulnerability reduction prediction 214 may include a single prediction or multiple predictions. The vulnerability reduction prediction 214 may be based on all or a portion of the available modifications 210 being applied to the software application 202.

The system 200 uses a graphical user interface (GUI) generation engine 216 to present (e.g., by operation of the output controller 128) a GUI (or other user interface (UI)) including the vulnerability reduction prediction 214 and one or more user-selectable elements for implementing one or more of the available modifications 210. The GUI may include a representation of all or a portion of the available modifications 210. An example of the GUI is described in conjunction with FIG. 3.

In some implementations, the system 200 calculates risk reduction metrics that quantify the security improvements achieved through different patching strategies. These metrics may include vulnerability severity reductions, exploit probability decreases, and overall security posture enhancements. As part of the CVE prediction process, the system 200 may generate comprehensive security metrics that provide actionable intelligence for security practitioners and development teams. These metrics support compliance reporting, security governance, and risk management activities across a single computing machine or a computer system including multiple computing machines, which may be connected to one another via one or more networks or direct connections.

In some implementations, the GUI generation engine 216 provides advanced data visualization capabilities that transform complex vulnerability data into intuitive, actionable insights. The interface generated by the GUI generation engine 216 may include interactive elements for patch selection, vulnerability prioritization, and implementation planning. Additionally, the system 200 may support customizable report generation for different stakeholders, including executive summaries, detailed technical documentation, and compliance-focused reporting. These reporting features facilitate communication of security improvements and support documentation, which may be used for compliance with regulations or best practices.

Figure 3:
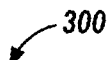
FIG. 3 illustrates an example of a graphical user interface for providing computer security through vulnerability management, in accordance with some embodiments.

FIG. 3 illustrates an example of a GUI 300 for providing computer security through vulnerability management, in accordance with some embodiments. The GUI 300 may be generated by the GUI generation engine 216. As shown, the GUI 300 indicates, in column 302, a current state of a software application (e.g., the software application 202). In column 304, the GUI indicates a proposed state of the software application where certain modifications (e.g., the available modifications 210) are implemented. As a result of the modifications, there are fewer vulnerabilities. FIG. 3 illustrates one example of the GUI disclosed herein. It should be noted that GUIs having other formats are also consistent with this disclosure.

Some implementations may include a user interface (e.g., the GUI 300) that provides functionality for selective patch version implementation, allowing security practitioners and developers to choose specific versions of replacement software components based on organizational requirements. This selective implementation capability enables fine-grained control over the patching process, allowing the security practitioners to balance security improvements against other considerations such as performance, compatibility, and operational stability. The user interface presents direct before/after CVE count comparisons for each potential patch implementation scenario, providing a visualization of the security impact of each selection decision. This comparative approach facilitates informed decision-making and prioritization of certain remediation efforts.

Figure 4:
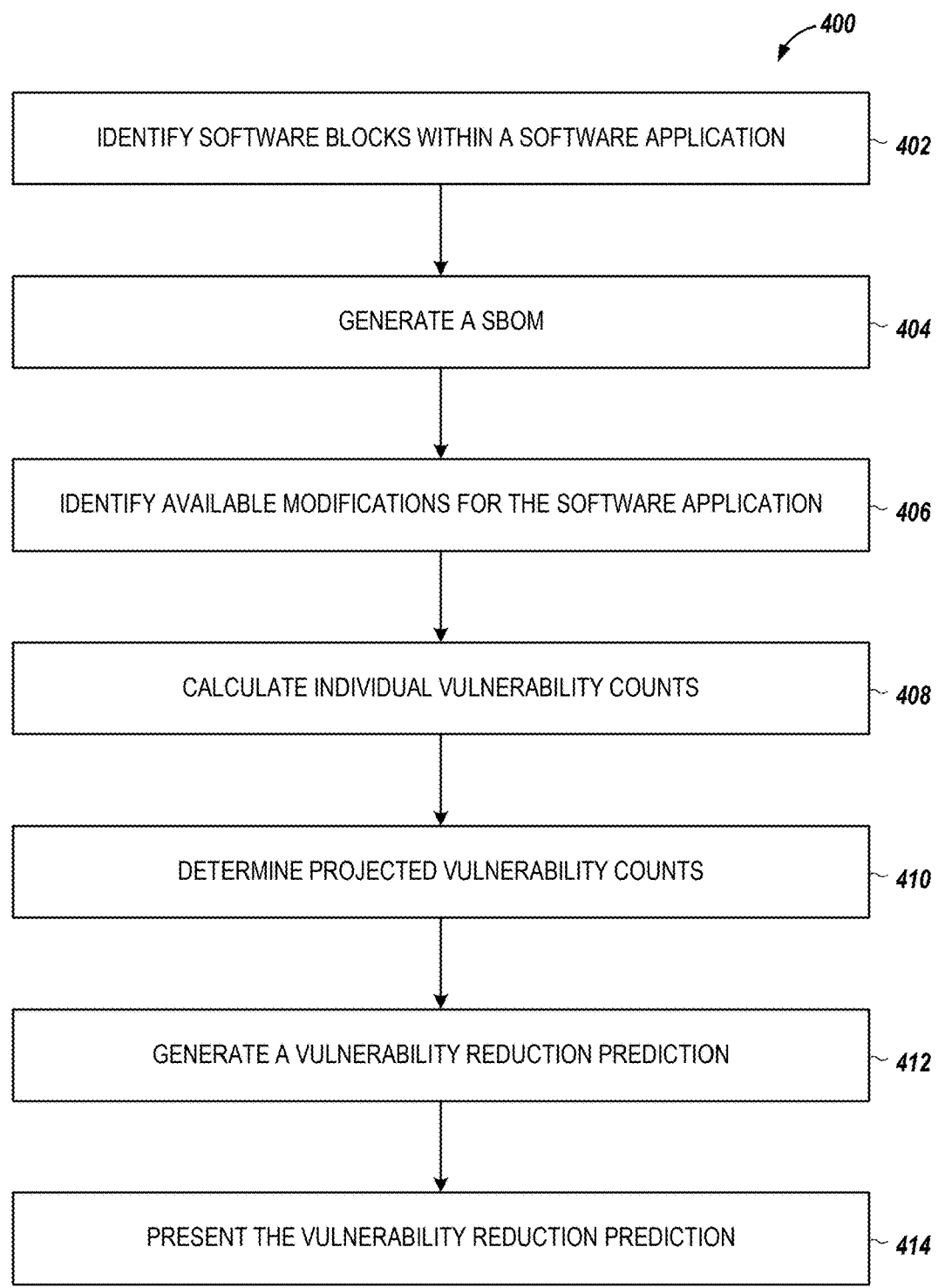
FIG. 4 is a flow chart of an example of a technique for providing computer security through vulnerability management, in accordance with some embodiments.

FIG. 4 is a flow chart of an example of a technique 400 for providing computer security through vulnerability management, in accordance with some embodiments.

At operation 402, processing circuitry (e.g., the processor 102) of a computing machine (e.g., the computing machine 100) identifies software blocks (e.g., the software blocks 204) within a software application (e.g., the software application 202). This may be done, for example, through automated image scanning, such as container image scanning, virtual machine image scanning, or package image scanning.

At operation 404, the processing circuitry generates a SBOM (e.g., the SBOM 206) based on the identified software blocks. The SBOM comprises metadata tags for the software blocks and a data structure mapping relationships between the software blocks. At least one of the metadata tags is applied to at least a first subset of the software blocks. The first subset may include one software block or more than one software blocks. In some implementations, a first metadata tag of the metadata tags identifies a name and version identifier for at least one software block of the software blocks. A second metadata tag of the metadata tags identifies dependency relationships for the at least one software block. A third metadata tag of the metadata tags identifies vulnerabilities associated with a specific version of the at least one software block currently existing in the software application. The dependency relationships are used to verify modification compatibility prior to implementation.

At operation 406, the processing circuitry identifies available modifications (e.g., the available modifications 210) for the software application corresponding to the SBOM. The available modifications are identified based on the metadata tags and compatibility with the mapped relationships. To identify the available modifications, the processing circuitry may query one or more software repositories for stored modifications, and verify compatibility between the stored modifications and the identified software blocks based on the metadata tags and the mapped relationships in the SBOM. As described herein, a patch is a type of modification. Accordingly, the available modifications may include at least one patch. In addition, one or more of the available modifications may be associated with a user-specified criterion. Because a patch is a type of modification, a given available modification that is a patch may also be associated with a user-specified criterion. The user-specified criterion may include at least one of a vulnerability count, a size, or a software or hardware compatibility criterion.

At operation 408, the processing circuitry calculates one or more individual vulnerability counts for at least a second subset of the software blocks and an aggregate vulnerability count (e.g., the aggregate vulnerability count 208) associated with a current state of the software application. The one or more individual vulnerability counts may be calculated for some or all of the software blocks, with some software blocks potentially having multiple vulnerability counts based on different definitions or classifications of vulnerabilities, while other software blocks may lack individual vulnerability counts entirely. The aggregate vulnerability count may represent a simple summation of individual vulnerability counts or may be derived through more sophisticated algorithms that consolidate vulnerability metrics in a meaningful way, such as by removing duplicate vulnerabilities across multiple software blocks.

At operation 410, the processing circuitry determines projected vulnerability counts (e.g., the projected vulnerability counts 212) based on vulnerability remediations by the identified available modifications. In some implementations, the projected vulnerability counts are determined through automated analysis of modification implementation impacts on the mapped relationships. In some implementations, to determine the projected vulnerability counts the processing circuitry may generate one or more modification implementation scenarios based on one or more combinations of the available modifications. The processing circuitry may calculate, for each modification implementation scenario, a corresponding projected vulnerability count. The processing circuitry may rank the one or more modification implementation scenarios based on their corresponding projected vulnerability counts and impacts on the mapped relationships in the SBOM.

At operation 412, the processing circuitry generates a vulnerability reduction prediction (e.g., the vulnerability reduction prediction 214) based on a comparison of the aggregate vulnerability count and the projected vulnerability counts. In some cases, the vulnerability reduction prediction corresponds to zero vulnerabilities being reduced (e.g., when one vulnerability is removed but another is added) or a negative number of vulnerabilities being reduced (e.g., when one vulnerability is removed but two others are added).

At operation 414, the processing circuitry presents, via a user interface (e.g., the GUI 300), the vulnerability reduction prediction and one or more user-selectable elements for implementing at least a portion of the identified available modifications. A first example of the user interface presents the projected vulnerability counts alongside the corresponding modification choice. In a second user interface, there is only one projection number in the user interface, the projection number changes according to the user's choice of modification. In some cases, the user interface shows the best (e.g., highest) number by default when the user has yet to make a selection of the one or more user-selectable elements. The user-selectable elements may include, for example and among other things, GUI-based elements (e.g., checkboxes, list boxes, or the like) or text-UI presentation (text-based checkbox, list box, or simply a prompt for inputting item number list (e.g., 3, 4-8, 11)). In some implementations, to present the vulnerability reduction prediction, the processing circuitry displays, in a first portion of the user interface, a first visualization of the software blocks in their current state with the individual vulnerability counts for the software blocks. The processing circuitry displays, in a second portion of the user interface, a second visualization of one or more proposed replacement software blocks with one or more corresponding projected vulnerability counts. The processing circuitry generates visual indicators linking each software block in the first portion to at least one corresponding proposed replacement software block in the second portion. In some implementations, the one or more proposed replacement software blocks correspond to application of at least a subset of the available modifications to at least one software block of the software blocks.

According to some implementations, after presenting the vulnerability reduction prediction and the user-selectable elements for implementing at least a portion of the available modifications, the processing circuitry receives a selection of one or more of the user-selectable elements and implements the corresponding available modifications. Implementing the corresponding available modifications updates the software application to reduce security vulnerabilities while maintaining software compatibility.

According to some implementations, the identification of software blocks and generation of the SBOM includes applying automated image scanning to the software application. The automated image scanning performs static analysis of the software application to identify potential use-based dependencies between the software blocks. A first software block has a potential use-based dependency on a second software block when execution of or data access by the first software block potentially requires the presence of the second software block. The SBOM is generated based on the identified potential use-based dependencies. The data structure mapping the relationships between the software blocks is updated to include the identified potential use-based dependencies. The compatibility of the available modifications with the mapped relationships is verified against the potential use-based dependencies determined through the static analysis of the software blocks.

According to some implementations, the processing circuitry obtains runtime data of the software application during runtime of the software application. The processing circuitry identifies actual use-based dependencies between the software blocks based on the obtained runtime data. A first software block has an actual use-based dependency on a second software block when execution of or data access by the first software block requires the presence of the second software block during the runtime of the software application. The processing circuitry generates an RBOM based on the identified actual use-based dependencies. The processing circuitry updates the data structure mapping the relationships between the software blocks to include the identified actual use-based dependencies. The processing circuitry verifies the compatibility of the available modifications with the mapped relationships against at least one of potential use-based dependencies determined through static analysis of the software blocks and the actual use-based dependencies observed during the runtime of the software application.

According to some implementations, the processing circuitry monitors implementation of at least the portion of the available modifications. The processing circuitry detects compatibility issues during the implementation. The processing circuitry rolls back the implementation upon detection of a compatibility issue. The processing circuitry updates the mapped relationships in the SBOM based on the compatibility issue.

According to some implementations, in addition to identifying available modifications, the processing circuitry identifies a set of security policies to prevent exploits of vulnerabilities in the software application. This may be used, for example, when patches are unavailable for critical vulnerabilities with known proof-of-concept (POC) exploits. The security policies may define protective behaviors that can be implemented to mitigate risk while awaiting patch availability.

The security policies identified by the processing circuitry may include, among other things, at least one of: network traffic filtering rules, application behavior monitoring rules, system call interception rules, and alert generation rules. These policies are designed to detect exploit attempts, prevent successful exploitation, and/or notify security practitioners when potentially malicious activity occurs. For example, if a specific network port or protocol is known to be vulnerable, a security policy might block or restrict access to that port until a proper patch can be implemented.

The processing circuitry presents the identified security policies via the user interface alongside the vulnerability reduction prediction and available modifications. This allows users to implement interim security measures for vulnerabilities that cannot be immediately patched. The processing circuitry also calculates and displays an estimated risk reduction score for each security policy, enabling users to prioritize policy implementation based on effectiveness (or based on other things).

After implementing the selected security policies, the processing circuitry monitors the software application for attempted exploits matching the patterns defined in the security policies. When detected, the processing circuitry generates appropriate alerts according to user-defined notification preferences and logs the events for security audit purposes. These logs may provide useful information for security practitioners to analyze attack patterns and further refine the security policies.

FIG. 5 is a flow chart of an example of a technique 500 for vulnerability management via a user interface, in accordance with some embodiments.

At operation 502, a computing machine (e.g., the computing machine 100) displays a first interface region (e.g., the column 302) comprising indications of one or more original software blocks and corresponding one or more original vulnerability metrics. In some implementations, the first interface region includes a first column having a first cell for a first original software block of the one or more original software blocks.

At operation 504, the computing machine displays a second interface region (e.g., the column 304) comprising one or more subregions corresponding to the one or more original software blocks. Each subregion comprises an element for indicating one or more replacement software blocks from one or more compatible replacement software blocks, and one or more replacement vulnerability metrics associated with the one or more indicated replacement software blocks. In some implementations, the second interface region is adjacent to the first interface region or is separated from the first interface region by a border. In some implementations, the second interface region includes a second column having a second cell for a subregion corresponding to the first original software block, and the first cell and the second cell are in a same row for the first original software block. The second column may be adjacent to the first column. The selection element (e.g., the user interface element for receiving the selection) may be a pull-down menu displaying identifiers for each of the one or more compatible replacement software blocks.

At operation 506, the computing machine displays aggregate vulnerability metrics comprising a first aggregate metric representing a count of vulnerabilities across the one or more original software blocks, and a second aggregate metric representing a count of vulnerabilities across the one or more indicated replacement software blocks. These aggregate metrics may be calculated through various methods including, but not limited to, a simple summation of individual vulnerability counts, or through more sophisticated evaluation algorithms that consolidate vulnerability metrics in a more meaningful way, such as by removing duplicate CVEs across the one or more software blocks, applying severity-based weighting, or utilizing other consolidation techniques that provide a comprehensive representation of the overall security posture beyond mere summation. In some implementations, the aggregate vulnerability metrics are displayed in a third interface region. The third interface region may be positioned above the first interface region and the second interface region. The computing machine may display a scroll bar for scrolling through the first interface region and the second interface region without scrolling through the third interface region.

At operation 508, the computing machine receives a user selection of a set of replacement software blocks for a particular subregion. The particular subregion may include all or a portion of the subregions in the user interface. In some examples, the particular subregions include all of the subregions. In some implementations, prior to receiving any user selection, the computing machine displays default replacement software blocks for each of the one or more original software blocks within the second interface region. These default selections are determined by a selection algorithm designed to optimize security improvement, such as by identifying a set of replacement software blocks that collectively reduce the greatest number of total vulnerabilities while maintaining compatibility. The default selections serve as a suggested starting point from which users can customize their selections according to specific requirements. In some cases, the replacement software block selection menu for each particular software block always includes the corresponding original software block as an option, allowing users to selectively maintain original versions where desired. In instances where no compatible patch or update is available for a particular software block, the original software block remains the only available option in the selection menu. Alternative implementations may initialize the user interface with "no change" as the default state for all software blocks, equivalent to the state achieved when a user activates a "reset" function. The user selection referenced in operation 508 may include explicit selections made by a user through interaction with the selection menu (or other user interface element for selection). In some examples, the user selections might not encompass automatically applied default selections that have not been explicitly confirmed by user action. Alternatively, the user selections might encompass automatically applied default selections that have not been explicitly confirmed by user action. The computing machine may store the user selection in a persistent data structure that maintains the selection across multiple user sessions.

At operation 510, the computing machine updates, in response to the user selection, the one or more replacement vulnerability metrics for the particular subregion to reflect vulnerabilities associated with the selected replacement software block, and the second aggregate metric to reflect the updated one or more replacement vulnerability metrics. The vulnerabilities associated with the selected replacement software block may include zero, one, or more than one vulnerability. Updating the one or more replacement vulnerability metrics and the second aggregate metric may occur in real-time in response to the user selection. As used herein, the term "real-time" may include an action occurring without any intentional delay. Unintentional delay, for example, due to latency of the processing circuitry, memory subsystem, other computing machine components, or network may still occur.

At operation 512, the computing machine displays a severity breakdown of the vulnerabilities associated with at least one of the first aggregate metric or the second aggregate metric. The severity breakdown may include categorizing the vulnerabilities into multiple severity levels (e.g., "critical," "high," "medium," or "low" as illustrated in FIG. 3). As used herein, the term "severity breakdown" encompasses its plain and ordinary meaning in the field of computer security and vulnerability management, and may refer to a categorization or classification of software vulnerabilities according to their severity levels or impact potential. A severity breakdown organizes vulnerabilities into hierarchical categories, which may include but are not limited to designations such as "critical," "high," "medium," and "low," each representing different degrees of security risk. These categorizations may be based on established industry standards such as the Common Vulnerability Scoring System (CVSS), organizational risk assessment frameworks, or other vulnerability rating methodologies. In some implementations, the computing machine determines a severity level for a vulnerability by calculating a CVSS score for a corresponding software block and mapping the CVSS score to a qualitative severity rating scale according to a CVSS specification. The CVSS score may be calculated in accordance with an industry standard CVSS specification or any other CVSS specification, and the mapping from CVSS score to qualitative severity level (e.g., "critical," "high," "medium", or "low") may follow a defined severity rating scale associated with the CVSS specification. The severity breakdown may enable security practitioners and developers to prioritize remediation efforts by focusing resources on addressing significant security threats first, while providing a structured representation of the overall vulnerability landscape for a software application or system. In the context of the user interface described herein, a severity breakdown may be visually presented as a distribution of vulnerabilities across different severity categories, allowing for rapid assessment of security posture before and after the implementation of available modifications. In some implementations, the computing machine further determines a contextual severity score that reflects a runtime environment of the software application. The contextual severity score may be calculated using a same methodology as a standard CVSS score, except that vulnerability contributions associated with software blocks or packages that are not executed in the runtime environment, as determined through runtime profiling, are excluded from the calculation. According to some implementations, the calculation of the contextual severity score further incorporates an environmental variable and a temporal variable. The environmental variable accounts for factors including, but not limited to, the availability and maturity of exploits associated with a given vulnerability. For example, a vulnerability for which only an unproven or theoretical exploit exists may receive a lower risk score than a vulnerability for which a mature, publicly available exploit exists. The temporal variable accounts for factors including, but not limited to, the temporal behavior of the software application, such as whether a software block or package associated with the vulnerability is executed during runtime. Vulnerability contributions associated with software blocks or packages that are not executed in the runtime environment, as determined through runtime profiling, may be excluded from or reduced in the calculation. The contextual severity score may therefore provide a severity breakdown that more accurately reflects actual runtime risk exposure of the software application.

In some implementations, the computing machine determines a priority score corresponding to a given original software block being replaced by a given replacement software block (e.g., set of replacement software blocks). The priority determination facilitates efficient vulnerability remediation by enabling prioritization of the most critical modifications. The priority score determination comprises calculating an exploitability metric based on one or more of current vulnerability exploit data associated with the given replacement software block and predicted future exploit probability data associated with the given replacement software block. The computing machine also calculates an impact metric based on contextual data associated with the given original software block. The contextual data may include usage context, deployment environment, organizational criticality, data sensitivity, or compliance requirements. The computing machine then determines the final priority score based on a combination of (e.g., at least one of, or each and every one of) the exploitability metric and the impact metric. The combination may utilize weighted averaging, non-linear functions, threshold-based adjustments, or other combinatorial approaches appropriate for accurately representing remediation priority.

In some implementations, the computing machine determines a priority score corresponding to a given original software block being replaced by a given replacement software block (e.g., set of replacement software blocks). The computing machine determines the priority score by calculating an exploitability metric based on one or more of current vulnerability exploit data associated with the given replacement software block and predicted future exploit probability data associated with the given replacement software block. The computing machine calculates an impact metric based on contextual data associated with the given original software block. The computing machine determines the priority score based on a combination of (e.g., at least one of, or each and every one of) the exploitability metric and the impact metric. The computing machine may display, within each subregion of the second interface region, the one or more compatible replacement software blocks in an order based on their respective priority scores.

In some implementations, the computing machine determines original software block priority score(s) to rank the vulnerability remediation urgency of each original software block. This enables the user (of the computing machine who is viewing the user interface) to focus remediation efforts on the most critical components first. The original software block priority score calculation may be based on at least one of (1) an original exploitability metric based on current vulnerability exploit data and predicted future exploit probability associated with the original software block, (2) availability of compatible replacement software blocks for the original software block or (3) an original impact metric derived from contextual data associated with the original software block. The computing machine may determine the original software block priority score through a weighted combination of these factors, potentially incorporating additional organizational risk tolerance parameters, which may be set by the user or by an administrator (e.g., an information technology administrator of an organization). This prioritization mechanism allows the computing machine to present original software blocks in an order that reflects their relative importance for remediation, allowing the user to allocate limited security resources to addressing the most critical vulnerabilities first.

In some implementations, the computing machine determines an original software block priority score for a first original software block. The computing machine determines the original software block priority score by calculating an original exploitability metric based on one or more of current vulnerability exploit data associated with the first original software block and predicted future exploit probability data associated with the first original software block. The computing machine analyzes availability of compatible replacement software blocks for the first original software block. The computing machine calculates an original impact metric based on contextual data associated with the first original software block. The computing machine determines the original software block priority score based on a combination of (e.g., at least one of, or each and every one of) the original exploitability metric, the availability of compatible replacement software blocks, and the original impact metric. The computing machine displays, in the first interface region, the indications of the one or more original software blocks in an order based on original software block priority scores determined for at least one of the one or more original software blocks. At least one of the one or more original software blocks includes the first original software block. The original software block priority scores include the original software block priority score for the first original software block.

In some implementations, the computing machine evaluates contextual data to enhance the precision of the impact metric calculations. This contextual data encompasses various dimensions including, but not limited to, the context of usage, deployment environment, system architecture position, data sensitivity, and operational criticality of the given original software block. The system may incorporate standardized vulnerability assessment frameworks such as the CVSS, which inherently accounts for contextual factors when evaluating vulnerability severity. For instance, in an enterprise application architecture containing both web server components (e.g., NGINX) and database components (e.g., PostgreSQL), the computing machine may assign substantially higher impact metrics to vulnerabilities affecting database components due to their typically greater potential for catastrophic business consequences. Database breaches often result in severe outcomes including loss of customer trust, regulatory penalties, legal liabilities, and data integrity compromises, whereas web server compromises, while serious, may present comparatively lower organizational risk profiles in many deployment contexts. By incorporating this contextual intelligence, the prioritization engine dynamically adjusts its guidance based on the specific deployment architecture and business context, directing remediation efforts toward modifications that address the most consequential vulnerabilities first.

The user interface system described herein supports multiple alternative implementations for visualizing vulnerability management scenarios and enhancing user decision-making. In one implementation, the system facilitates side-by-side comparison of multiple patching strategies simultaneously. For example, the interface may present three columns: the first column showing the original software blocks, while the second and third columns each display available modifications with independent selection menus for each row. This approach enables users to directly compare the effects of different modification scenarios concurrently, similar to "compare multiple products" features commonly found in e-commerce platforms. The user interface may include functionality to dynamically add additional comparison columns through interface elements similar to the "add a new tab" feature in some web browsers.

In some implementations, the computing machine displays an additional interface region comprising one or more additional subregions corresponding to the one or more original software blocks. For example, each additional subregion may correspond to a respective subregion of the one or more subregions of the second interface region and may correspond to a same original software block as the respective subregion of the second interface region. As used herein, the term "respective" indicates a correspondence relationship between elements and may refer to at least one corresponding element, but does not necessarily require that every element in a referenced group has a corresponding element. For example, if multiple software blocks are present in an application, a respective software block having a particular attribute may mean that at least one software block in the group has that attribute, without requiring that all software blocks in the group have that attribute. Each additional subregion includes a second element for indicating one or more second replacement software blocks from the one or more compatible replacement software blocks, and one or more second replacement vulnerability metrics associated with the one or more indicated second replacement software blocks. The selection of the second replacement software blocks in the additional interface region is independent from the selection of replacement software blocks in the second interface region. For example, the one or more second replacement software blocks indicated in a respective additional subregion are independent from the one or more replacement software blocks indicated in the corresponding respective subregion of the second interface region. The second aggregate metric is separately calculated and displayed for each of the second interface region and the additional interface region. The computing machine may display a control element for adding another interface region for selecting other replacement software blocks.

Alternative visualization approaches are also within the scope of the disclosed technology. While the described implementation primarily compares software states vertically (e.g., original versus proposed modifications as shown in FIG. 3), the disclosed technology may also support horizontal comparison methods or present data in summarized list formats that highlight key differences between patching scenarios. These alternative visualization techniques allow for adaptation to different user preferences and decision-making styles. In some implementations, the computing machine displays a control element for resetting the set of the replacement software blocks (e.g., across the one or more subregions) to their corresponding original software blocks. The computing machine updates the second aggregate metric in response to selection of the control element.

Some implementations may incorporate a graphical representation in the form of a dependency map within the user interface. This graphical representation visually represents the relationships and dependencies between software blocks, providing users with a more intuitive understanding of how modifications to one component might affect others within the software application. Such a graphical representation may be valuable when addressing complex software architectures with numerous interdependencies, enabling more informed decision-making regarding vulnerability remediation strategies. In some implementations, the computing machine identifies the one or more compatible replacement software blocks for an original software block of the one or more original software blocks by analyzing dependency relationships defined in a software bill of materials.

In scenarios where direct replacement images are unavailable for a particular software block, the disclosed technology may suggest alternative remediation strategies. These could include identifying individual components within the software block that are ready for patching, even if the entire block cannot be replaced. This component-level remediation approach might provide additional flexibility in addressing vulnerabilities when complete replacement is not feasible due to compatibility constraints or other limitations.

According to some implementations, the computing machine generates, in response to a user input, an exportable report. The exportable report indicates (e.g., among other things) the one or more original software blocks, the set of the replacement software blocks (e.g., the selected set of the replacement software blocks), vulnerability metrics of the one or more original software blocks, and vulnerability metrics of the set of the selected replacement software blocks (e.g., across the one or more subregions).

According to some implementations, the computing machine accesses a software application for analysis. The computing machine identifies the one or more original software blocks through automated image scanning of the software application. The computing machine generates a software bill of materials based on the one or more original software blocks. The software bill of materials comprises a data structure mapping relationships between the one or more original software blocks. The computing machine calculates the one or more original vulnerability metrics by identifying, for each original software block, vulnerabilities associated with a specific version of the original software block, and determining the first aggregate metric based on the identified vulnerabilities. The computing machine identifies the one or more compatible replacement software blocks by querying one or more software repositories for stored patches, and verifying compatibility between the stored patches and the one or more original software blocks based on the mapped relationships in the software bill of materials. The computing machine calculates the one or more replacement vulnerability metrics based on vulnerability remediations provided by the one or more compatible replacement software blocks.

In an example real-world use case of the disclosed technology, a financial services organization operating a portfolio of critical banking applications faces significant challenges maintaining security compliance while managing their complex software ecosystem. Their primary trading platform consists of over two-hundred containerized microservices with thousands of software dependencies, each potentially containing vulnerabilities. The security team spends approximately forty person-hours per week manually reviewing CVE notifications and determining which components require patching, with an average remediation time of twelve days from vulnerability disclosure to patch implementation. By implementing the system described herein, the organization automates the scanning of all container images, generates comprehensive SBOMs for each microservice, and receives projected vulnerability reduction predictions for available patches. The implementation includes a security dashboard that presents both current vulnerability counts and projected post-patching metrics, allowing the security team to prioritize remediation efforts based on quantifiable security improvements. The selective patch implementation feature enables the security team to choose specific versions that maintain compatibility with the trading algorithms while addressing critical vulnerabilities. As a result, the organization is able to reduce its vulnerability assessment time and decrease their average patch implementation time, thereby improving their security posture while meeting regulatory compliance requirements with substantially reduced resource expenditure.

The financial services organization implements the system by first deploying the software scanning module within their continuous integration pipeline. Each container image is automatically scanned upon creation using the automated image scanning technology described herein, which performs static analysis to identify all software components and their versions. The scanning process examines package manager manifests (e.g., requirements.txt, package.json, Gemfile), binary executables, and library dependencies to create a comprehensive inventory. This inventory feeds into the SBOM generation module, which constructs a multi-dimensional graph database representing component relationships, with metadata tags identifying name, version, and known vulnerabilities for each component. The system then queries multiple vulnerability databases and package repositories to identify available patches for each vulnerable component. The CVE prediction engine analyzes potential patch scenarios by simulating the application of each patch and recalculating vulnerability metrics based on known CVE resolutions. The resulting data is presented through a web-based dashboard where security practitioners can view vulnerability metrics organized by severity level (critical, high, medium, or low) for both current and projected states. The dashboard includes an interactive selection interface allowing users to choose specific patch versions for each component, with real-time updates to projected vulnerability counts as selections change. When a patch implementation plan is finalized, the system generates patch manifests that integrate with the financial services organization's deployment pipeline, automating the application of selected patches to the relevant microservices.

FIG. 6 illustrates an example of a GUI 600 for providing computer security, in accordance with some embodiments. The GUI 600 may be generated by the GUI generation engine 216. As shown, the GUI 600 indicates, in column 602, original (e.g., current) images of a software application (e.g., the software application 202). In column 604, the GUI indicates mapped images corresponding to a proposed state of the software application where certain modifications (e.g., some of the available modifications 210) are implemented. As a result of the modifications, there are fewer vulnerabilities. FIG. 6 illustrates one example of the GUI disclosed herein. It should be noted that GUIs having other formats are also consistent with this disclosure.

As shown, the column 602 lists various names of original images, including "WORDPRESS: LATEST," "PYTHON: 3.11," "NGINX: LATEST," "REDIS: LATEST," AND "ETCD: V3.6.18." The column 604 includes, for each original image, a dropdown menu for selecting the original image or a replacement image. As shown, for "WORDPRESS: LATEST," the original image is selected. For each of the other images, a replacement image is selected. The user may modify the selection by operating the dropdown menu, for example, using a mouse or using a touchscreen. Modification of the selection causes a change of the number of vulnerabilities indicated in the column 604—including the total number of vulnerabilities, the critical, high, medium, or low vulnerabilities, and the vulnerabilities for the selection that was modified.

The GUI 600 further includes a summary section for the original images 606 and a summary section for the mapped images 608 at the top of the GUI displaying aggregate vulnerability metrics. The summary section for the original images 606 presents the total vulnerability count for the original images, along with a breakdown by severity level. The summary section for the mapped images 608 presents the total vulnerability count for the mapped images, along with a breakdown by severity level. As shown, the severity levels include "critical," "high," "medium," and "low." However, other names for the severity levels may be used in conjunction with the technology disclosed herein. As shown, the original images of column 602 have a total of 510 vulnerabilities (23 critical, 75 high, 195 medium, and 217 low), while the mapped images of column 604 with the selected replacements show a reduced count of 189 vulnerabilities (9 critical, 19 high, 115 medium, and 46 low), representing an overall reduction in vulnerabilities of over 60%.

The illustrated GUI 600 is presented in FIG. 6 in a simplified form. It should be noted that the GUI 600 may be expanded to provide additional functionality. In some implementations, the GUI 600 may include a "Reset All" button (not shown) that returns all selections to their original images, or an "Apply Changes" button (not shown) that initiates the implementation of the selected replacement images. In some implementations, a color-coded indicator (not shown) may appear next to each replacement option in the column 604, providing an immediate visual representation of the relative security improvement (e.g., green for significant improvement, yellow for moderate improvement, and red for minimal or no improvement). Some implementations may allow the user to view detailed vulnerability information for any specific image through an expandable details section (not shown), which may appear when the user selects a "Details" button (not shown) associated with each image row.

Some embodiments are described as numbered examples (Example E1, E2, E3, etc.). These are provided as examples only and do not limit the technology disclosed herein.

Example E1 is a method for improving computer security through vulnerability management, the method comprising: identifying, by processing circuitry of one or more computing machines, one or more software blocks within a software application; generating, by the processing circuitry, a software bill of materials based on the identified one or more software blocks, wherein the software bill of materials comprises metadata tags for the one or more software blocks and a data structure mapping relationships between the one or more software blocks, wherein at least one of the metadata tags is applied to at least a first subset of the one or more software blocks; identifying, by the processing circuitry, one or more available modifications for the software application corresponding to the software bill of materials, wherein the one or more available modifications are identified based on the metadata tags and compatibility with the mapped relationships; calculating, by the processing circuitry, one or more individual vulnerability counts for at least a second subset of the one or more software blocks and an aggregate vulnerability count associated with a current state of the software application; determining, by the processing circuitry, one or more projected vulnerability counts based on vulnerability remediations by the one or more available modifications; generating, by the processing circuitry, a vulnerability reduction prediction based on a comparison of the aggregate vulnerability count and the one or more projected vulnerability counts; and presenting, by the processing circuitry and via a user interface, the vulnerability reduction prediction and one or more user-selectable elements for implementing at least a portion of the one or more available modifications.

In Example E2, the subject matter of Example E1 includes, wherein a first metadata tag of the metadata tags identifies a name and version identifier for at least one software block of the one or more software blocks, wherein a second metadata tag of the metadata tags identifies dependency relationships for the at least one software block, and wherein a third metadata tag of the metadata tags identifies vulnerabilities associated with a specific version of the at least one software block currently existing in the software application, and wherein the dependency relationships are used to verify modification compatibility prior to implementation.

In Example E3, the subject matter of Examples E1-E2 includes, wherein identifying the one or more available modifications comprises: querying one or more software repositories for stored modifications; and verifying compatibility between the stored modifications and the identified one or more software blocks based on the metadata tags and the mapped relationships in the software bill of materials.

In Example E4, the subject matter of Examples E1-E3 includes, wherein implementing the at least the portion of the one or more available modifications updates the software application to reduce security vulnerabilities while maintaining software compatibility.

In Example E5, the subject matter of Examples E1-E4 includes, wherein determining the one or more projected vulnerability counts comprises: generating, by the processing circuitry, one or more modification implementation scenarios based on one or more combinations of the one or more available modifications; calculating, for each modification implementation scenario, a corresponding projected vulnerability count; and ranking the one or more modification implementation scenarios based on their corresponding projected vulnerability counts and impacts on the mapped relationships in the software bill of materials.

In Example E6, the subject matter of Examples E1-E5 includes, wherein identifying the one or more software blocks and generating the software bill of materials comprise: applying automated image scanning to the software application, wherein the automated image scanning performs static analysis of the software application to identify potential use-based dependencies between the one or more software blocks, wherein a first software block has a potential use-based dependency on a second software block when execution of or data access by the first software block potentially requires a presence of the second software block; generating the software bill of materials based on the identified potential use-based dependencies; and updating the data structure mapping the relationships between the one or more software blocks to include the identified potential use-based dependencies, wherein the compatibility of the one or more available modifications with the mapped relationships is verified against the potential use-based dependencies determined through the static analysis of the one or more software blocks.

In Example E7, the subject matter of Examples E1-E6 includes, obtaining runtime data of the software application during runtime of the software application; identifying, by the processing circuitry, actual use-based dependencies between the one or more software blocks based on the obtained runtime data, wherein a first software block has an actual use-based dependency on a second software block when execution of or data access by the first software block requires a presence of the second software block during the runtime of the software application; generating a runtime bill of materials based on the identified actual use-based dependencies; and updating the data structure mapping the relationships between the one or more software blocks to include the identified actual use-based dependencies, wherein the compatibility of the one or more available modifications with the mapped relationships is verified against at least one of potential use-based dependencies determined through static analysis of the one or more software blocks and the actual use-based dependencies observed during the runtime of the software application.

In Example E8, the subject matter of Examples E1-E7 includes, monitoring, by the processing circuitry, implementation of the at least the portion of the one or more available modifications; detecting any compatibility issues during the implementation; automatically rolling back the implementation upon detection of a compatibility issue; and updating the mapped relationships in the software bill of materials based on the compatibility issue.

In Example E9, the subject matter of Examples E1-E8 includes, wherein identifying the one or more software blocks and generating the software bill of materials comprise: applying automated image scanning to the software application, wherein the automated image scanning comprises at least one of: container image scanning, virtual machine image scanning, or package image scanning.

In Example E10, the subject matter of Examples E1-E9 includes, wherein the one or more available modifications comprise at least one patch.

In Example E11, the subject matter of Examples E1-E10 includes, wherein the one or more available modifications comprise at least one modification associated with a user-specified criterion, wherein the user-specified criterion comprises at least one of a vulnerability count, a size, or a software or hardware compatibility criterion.

In Example E12, the subject matter of Examples E1-E11 includes, wherein presenting the vulnerability reduction prediction comprises: displaying, in a first portion of the user interface, a first visualization of the one or more software blocks in their current state with the one or more individual vulnerability counts for the one or more software blocks; displaying, in a second portion of the user interface, a second visualization of one or more proposed replacement software blocks with one or more corresponding projected vulnerability counts; and generating visual indicators linking each software block in the first portion to at least one corresponding proposed replacement software block in the second portion.

In Example E13, the subject matter of Example E12 includes, wherein the one or more proposed replacement software blocks correspond to application of at least a subset of the one or more available modifications to at least one software block of the one or more software blocks.

Example E14 is a computer-readable medium for improving computer security through vulnerability management, the computer-readable medium storing instructions which, when executed by processing circuitry, cause the processing circuitry to perform operations comprising: identifying, by processing circuitry of one or more computing machines, one or more software blocks within a software application; generating, by the processing circuitry, a software bill of materials based on the identified one or more software blocks, wherein the software bill of materials comprises metadata tags for the one or more software blocks and a data structure mapping relationships between the one or more software blocks, wherein at least one of the metadata tags is applied to at least a first subset of the one or more software blocks; identifying, by the processing circuitry, one or more available modifications for the software application corresponding to the software bill of materials, wherein the one or more available modifications are identified based on the metadata tags and compatibility with the mapped relationships; calculating, by the processing circuitry, one or more individual vulnerability counts for at least a second subset of the one or more software blocks and an aggregate vulnerability count associated with a current state of the software application; determining, by the processing circuitry, one or more projected vulnerability counts based on vulnerability remediations by the one or more available modifications; generating, by the processing circuitry, a vulnerability reduction prediction based on a comparison of the aggregate vulnerability count and the one or more projected vulner-ability counts; and presenting, by the processing circuitry and via a user interface, the vulnerability reduction prediction and one or more user-selectable elements for implementing at least a portion of the one or more available modifications.

In Example E15, the subject matter of Example E14 includes, wherein a first metadata tag of the metadata tags identifies a name and version identifier for at least one software block of the one or more software blocks, wherein a second metadata tag of the metadata tags identifies dependency relationships for the at least one software block, and wherein a third metadata tag of the metadata tags identifies vulnerabilities associated with a specific version of the at least one software block currently existing in the software application, and wherein the dependency relationships are used to verify modification compatibility prior to implementation.

In Example E16, the subject matter of Examples E14-E15 includes, wherein identifying the one or more available modifications comprises: querying one or more software repositories for stored modifications; and verifying compatibility between the stored modifications and the identified one or more software blocks based on the metadata tags and the mapped relationships in the software bill of materials.

In Example E17, the subject matter of Examples E14-E16 includes, wherein implementing the at least the portion of the one or more available modifications updates the software application to reduce security vulnerabilities while maintaining software compatibility.

In Example E18, the subject matter of Examples E14-E17 includes, wherein determining the one or more projected vulnerability counts comprises: generating, by the processing circuitry, one or more modification implementation scenarios based on one or more combinations of the one or more available modifications; calculating, for each modification implementation scenario, a corresponding projected vulnerability count; and ranking the one or more modification implementation scenarios based on their corresponding projected vulnerability counts and impacts on the mapped relationships in the software bill of materials.

In Example E19, the subject matter of Examples E14-E18 includes, wherein identifying the one or more software blocks and generating the software bill of materials comprise: applying automated image scanning to the software application, wherein the automated image scanning performs static analysis of the software application to identify potential use-based dependencies between the one or more software blocks, wherein a first software block has a potential use-based dependency on a second software block when execution of or data access by the first software block potentially requires a presence of the second software block; generating the software bill of materials based on the identified potential use-based dependencies; and updating the data structure mapping the relationships between the one or more software blocks to include the identified potential use-based dependencies, wherein the compatibility of the one or more available modifications with the mapped relationships is verified against the potential use-based dependencies determined through the static analysis of the one or more software blocks.

In Example E20, the subject matter of Examples E14-E19 includes, the operations further comprising: obtaining runtime data of the software application during runtime of the software application; identifying, by the processing circuitry, actual use-based dependencies between the one or more software blocks based on the obtained runtime data, wherein a first software block has an actual use-based dependency on a second software block when execution of or data access by the first software block requires a presence of the second software block during the runtime of the software application; generating a runtime bill of materials based on the identified actual use-based dependencies; and updating the data structure mapping the relationships between the one or more software blocks to include the identified actual use-based dependencies, wherein the compatibility of the one or more available modifications with the mapped relationships is verified against at least one of potential use-based dependencies determined through static analysis of the one or more software blocks and the actual use-based dependencies observed during the runtime of the software application.

In Example E21, the subject matter of Examples E14-E20 includes, the operations further comprising: monitoring, by the processing circuitry, implementation of the at least the portion of the one or more available modifications; detecting any compatibility issues during the implementation; automatically rolling back the implementation upon detection of a compatibility issue; and updating the mapped relationships in the software bill of materials based on the compatibility issue.

In Example E22, the subject matter of Examples E14-E21 includes, wherein identifying the one or more software blocks and generating the software bill of materials comprise: applying automated image scanning to the software application, wherein the automated image scanning comprises at least one of: container image scanning, virtual machine image scanning, or package image scanning.

In Example E23, the subject matter of Examples E14-E22 includes, wherein the one or more available modifications comprise at least one patch.

In Example E24, the subject matter of Examples E14-E23 includes, wherein the one or more available modifications comprise at least one modification associated with a user-specified criterion, wherein the user-specified criterion comprises at least one of a vulnerability count, a size, or a software or hardware compatibility criterion.

In Example E25, the subject matter of Examples E14-E24 includes, wherein presenting the vulnerability reduction prediction comprises: displaying, in a first portion of the user interface, a first visualization of the one or more software blocks in their current state with the one or more individual vulnerability counts for the one or more software blocks; displaying, in a second portion of the user interface, a second visualization of one or more proposed replacement software blocks with one or more corresponding projected vulnerability counts; and generating visual indicators linking each software block in the first portion to at least one corresponding proposed replacement software block in the second portion.

In Example E26, the subject matter of Example E25 includes, wherein the one or more proposed replacement software blocks correspond to application of at least a subset of the one or more available modifications to at least one software block of the one or more software blocks.

Example E27 is a system for improving computer security through vulnerability management, the system comprising: processing circuitry; and a memory subsystem storing instructions which, when executed by the processing circuitry, cause the processing circuitry to perform operations comprising: identifying, by processing circuitry of one or more computing machines, one or more software blocks within a software application; generating, by the processing circuitry, a software bill of materials based on the identified one or more software blocks, wherein the software bill of materials comprises metadata tags for the one or more software blocks and a data structure mapping relationships between the one or more software blocks, wherein at least one of the metadata tags is applied to at least a first subset of the one or more software blocks; identifying, by the processing circuitry, one or more available modifications for the software application corresponding to the software bill of materials, wherein the one or more available modifications are identified based on the metadata tags and compatibility with the mapped relationships; calculating, by the processing circuitry, one or more individual vulnerability counts for at least a second subset of the one or more software blocks and an aggregate vulnerability count associated with a current state of the software application; determining, by the processing circuitry, one or more projected vulnerability counts based on vulnerability remediations by the one or more available modifications; generating, by the processing circuitry, a vulnerability reduction prediction based on a comparison of the aggregate vulnerability count and the one or more projected vulnerability counts; and presenting, by the processing circuitry and via a user interface, the vulnerability reduction prediction and one or more user-selectable elements for implementing at least a portion of the one or more available modifications.

In Example E28, the subject matter of Example E27 includes, wherein a first metadata tag of the metadata tags identifies a name and version identifier for at least one software block of the one or more software blocks, wherein a second metadata tag of the metadata tags identifies dependency relationships for the at least one software block, and wherein a third metadata tag of the metadata tags identifies vulnerabilities associated with a specific version of the at least one software block currently existing in the software application, and wherein the dependency relationships are used to verify modification compatibility prior to implementation.

In Example E29, the subject matter of Examples E27-E28 includes, wherein identifying the one or more available modifications comprises: querying one or more software repositories for stored modifications; and verifying compatibility between the stored modifications and the identified one or more software blocks based on the metadata tags and the mapped relationships in the software bill of materials.

In Example E30, the subject matter of Examples E27-E29 includes, wherein implementing the at least the portion of the one or more available modifications updates the software application to reduce security vulnerabilities while maintaining software compatibility.

In Example E31, the subject matter of Examples E27-E30 includes, wherein determining the one or more projected vulnerability counts comprises: generating, by the processing circuitry, one or more modification implementation scenarios based on one or more combinations of the one or more available modifications; calculating, for each modification implementation scenario, a corresponding projected vulnerability count; and ranking the one or more modification implementation scenarios based on their corresponding projected vulnerability counts and impacts on the mapped relationships in the software bill of materials.

In Example E32, the subject matter of Examples E27-E31 includes, wherein identifying the one or more software blocks and generating the software bill of materials comprise: applying automated image scanning to the software application, wherein the automated image scanning performs static analysis of the software application to identify potential use-based dependencies between the one or more software blocks, wherein a first software block has a potential use-based dependency on a second software block when execution of or data access by the first software block potentially requires a presence of the second software block; generating the software bill of materials based on the identified potential use-based dependencies; and updating the data structure mapping the relationships between the one or more software blocks to include the identified potential use-based dependencies, wherein the compatibility of the one or more available modifications with the mapped relationships is verified against the potential use-based dependencies determined through the static analysis of the one or more software blocks.

In Example E33, the subject matter of Examples E27-E32 includes, the operations further comprising: obtaining runtime data of the software application during runtime of the software application; identifying, by the processing circuitry, actual use-based dependencies between the one or more software blocks based on the obtained runtime data, wherein a first software block has an actual use-based dependency on a second software block when execution of or data access by the first software block requires a presence of the second software block during the runtime of the software application; generating a runtime bill of materials based on the identified actual use-based dependencies; and updating the data structure mapping the relationships between the one or more software blocks to include the identified actual use-based dependencies, wherein the compatibility of the one or more available modifications with the mapped relationships is verified against at least one of potential use-based dependencies determined through static analysis of the one or more software blocks and the actual use-based dependencies observed during the runtime of the software application.

In Example E34, the subject matter of Examples E27-E33 includes, the operations further comprising: monitoring, by the processing circuitry, implementation of the at least the portion of the one or more available modifications; detecting any compatibility issues during the implementation; automatically rolling back the implementation upon detection of a compatibility issue; and updating the mapped relationships in the software bill of materials based on the compatibility issue.

In Example E35, the subject matter of Examples E27-E34 includes, wherein identifying the one or more software blocks and generating the software bill of materials comprise: applying automated image scanning to the software application, wherein the automated image scanning comprises at least one of: container image scanning, virtual machine image scanning, or package image scanning.

In Example E36, the subject matter of Examples E27-E35 includes, wherein the one or more available modifications comprise at least one patch.

In Example E37, the subject matter of Examples E27-E36 includes, wherein the one or more available modifications comprise at least one modification associated with a user-specified criterion, wherein the user-specified criterion comprises at least one of a vulnerability count, a size, or a software or hardware compatibility criterion.

In Example E38, the subject matter of Examples E27-E37 includes, wherein presenting the vulnerability reduction prediction comprises: displaying, in a first portion of the user interface, a first visualization of the one or more software blocks in their current state with the one or more individual vulnerability counts for the one or more software blocks; displaying, in a second portion of the user interface, a second visualization of one or more proposed replacement software blocks with one or more corresponding projected vulnerability counts; and generating visual indicators linking each software block in the first portion to at least one corresponding proposed replacement software block in the second portion.

In Example E39, the subject matter of Example E38 includes, wherein the one or more proposed replacement software blocks correspond to application of at least a subset of the one or more available modifications to at least one software block of the one or more software blocks.

Example E40 is a computer-implemented method for vulnerability management via a user interface, the method comprising: displaying, by a computing machine, a first interface region comprising indications of one or more original software blocks and corresponding one or more original vulnerability metrics; displaying, by the computing machine, a second interface region comprising one or more subregions corresponding to the one or more original software blocks, wherein each subregion comprises: an element for indicating one or more replacement software blocks from one or more compatible replacement software blocks, and one or more replacement vulnerability metrics associated with the one or more indicated replacement software blocks; displaying, by the computing machine, aggregate vulnerability metrics comprising: a first aggregate metric representing a count of vulnerabilities across the one or more original software blocks, and a second aggregate metric representing a count of vulnerabilities across the one or more indicated replacement software blocks; receiving, by the computing machine, a user selection of a set of replacement software blocks for a particular subregion; updating, by the computing machine and in response to the user selection, the one or more replacement vulnerability metrics for the particular subregion to reflect vulnerabilities associated with the selected replacement software block, and the second aggregate metric to reflect the updated one or more replacement vulnerability metrics; and displaying, by the computing machine, a severity breakdown of the vulnerabilities associated with at least one of the first aggregate metric or the second aggregate metric.

In Example E41, the subject matter of Example E40 includes, generating, by the computing machine in response to a user input, an exportable report indicating the one or more original software blocks, the set of the replacement software blocks, vulnerability metrics of the one or more original software blocks, and vulnerability metrics of the set of the selected replacement software blocks.

In Example E42, the subject matter of Examples E40-E41 includes, identifying, by the computing machine, the one or more compatible replacement software blocks for an original software block of the one or more original software blocks by analyzing dependency relationships defined in a software bill of materials.

In Example E43, the subject matter of Examples E40-E42 includes, storing, by the computing machine, the user selection in a persistent data structure that maintains the selection across multiple user sessions.

In Example E44, the subject matter of Examples E40-E43 includes, wherein the severity breakdown comprises categorizing the vulnerabilities into a plurality of severity levels.

In Example E45, the subject matter of Examples E40-E44 includes, wherein: the first interface region comprises a first column having a first cell for a first original software block of the one or more original software blocks, the second interface region comprises a second column, having a second cell for a subregion corresponding to the first original software block, and the first cell and the second cell are in a same row for the first original software block.

In Example E46, the subject matter of Example E45 includes, wherein the second column is adjacent to the first column.

In Example E47, the subject matter of Examples E40-E46 includes, wherein the aggregate vulnerability metrics are displayed in a third interface region, wherein the third interface region is positioned above the first interface region and the second interface region.

In Example E48, the subject matter of Examples E40-E47 includes, wherein the aggregate vulnerability metrics are displayed in a third interface region, the method further comprising: displaying, by the computing machine, a scroll bar for scrolling through the first interface region and the second interface region without scrolling through the third interface region.

In Example E49, the subject matter of Examples E40-E48 includes, wherein updating the one or more replacement vulnerability metrics and the second aggregate metric occurs in real-time in response to the user selection.

In Example E50, the subject matter of Examples E40-E49 includes, wherein the selection element comprises a pull-down menu displaying identifiers for each of the one or more compatible replacement software blocks.

In Example E51, the subject matter of Examples E40-E50 includes, displaying, by the computing machine, a control element for resetting the set of the replacement software blocks to their corresponding original software blocks; and updating, by the computing machine, the second aggregate metric in response to selection of the control element.

In Example E52, the subject matter of Examples E40-E51 includes, accessing, by the computing machine, a software application for analysis; identifying, by the computing machine, the one or more original software blocks through automated image scanning of the software application; generating a software bill of materials based on the one or more original software blocks, wherein the software bill of materials comprises a data structure mapping relationships between the one or more original software blocks; calculating the one or more original vulnerability metrics by: identifying, for each original software block, vulnerabilities associated with a specific version of the original software block, and determining the first aggregate metric based on the identified vulnerabilities; identifying the one or more compatible replacement software blocks based on: querying one or more software repositories for stored patches, and verifying compatibility between the stored patches and the one or more original software blocks based on the mapped relationships in the software bill of materials; and calculating the one or more replacement vulnerability metrics based on vulnerability remediations provided by the one or more compatible replacement software blocks.

In Example E53, the subject matter of Examples E40-E52 includes, displaying, by the computing machine, an additional interface region comprising one or more additional subregions corresponding to the one or more original software blocks, wherein: each additional subregion comprises a second element for indicating one or more second replacement software blocks from the one or more compatible replacement software blocks, and one or more second replacement vulnerability metrics associated with the one or more indicated second replacement software blocks, the selection of the second replacement software blocks in the additional interface region is independent from the selection of replacement software blocks in the second interface region, and the second aggregate metric is separately calculated and displayed for each of the second interface region and the additional interface region; and displaying, by the computing machine, a control element for adding another interface region for selecting other replacement software blocks.

In Example E54, the subject matter of Examples E40-E53 includes, determining, by the computing machine, a priority score corresponding to a given original software block being replaced by a given replacement software block, wherein determining the priority score comprises: calculating an exploitability metric based on: one or more of current vulnerability exploit data associated with the given replacement software block, and predicted future exploit probability data associated with the given replacement software block, calculating an impact metric based on contextual data associated with the given original software block, and determining the priority score based on a combination of the exploitability metric and the impact metric.

In Example E55, the subject matter of Example E54 includes, displaying, by the computing machine and within each subregion of the second interface region, the one or more compatible replacement software blocks in an order based on their respective priority scores.

In Example E56, the subject matter of Examples E40-E55 includes, determining, by the computing machine, an original software block priority score for a first original software block, wherein determining the original software block priority score comprises: calculating an original exploitability metric based on one or more of: current vulnerability exploit data associated with the first original software block, and predicted future exploit probability data associated with the first original software block, analyzing availability of compatible replacement software blocks for the first original software block, calculating an original impact metric based on contextual data associated with the first original software block, and determining the original software block priority score based on a combination of the original exploitability metric, the availability of compatible replacement software blocks, and the original impact metric.

In Example E57, the subject matter of Example E56 includes, displaying, by the computing machine and in the first interface region, the indications of the one or more original software blocks in an order based on original software block priority scores determined for at least one of the one or more original software blocks, wherein the at least one of the one or more original software blocks include the first original software block, wherein the original software block priority scores include the original software block priority score for the first original software block.

Example E58 is a computer-readable medium for vulnerability management via a user interface, the computer-readable medium storing instructions which, when executed by processing circuitry, cause the processing circuitry to perform operations comprising: displaying, by a computing machine, a first interface region comprising indications of one or more original software blocks and corresponding one or more original vulnerability metrics; displaying, by the computing machine, a second interface region comprising one or more subregions corresponding to the one or more original software blocks, wherein each subregion comprises: an element for indicating one or more replacement software blocks from one or more compatible replacement software blocks, and one or more replacement vulnerability metrics associated with the one or more indicated replacement software blocks; displaying, by the computing machine, aggregate vulnerability metrics comprising: a first aggregate metric representing a count of vulnerabilities across the one or more original software blocks, and a second aggregate metric representing a count of vulnerabilities across the one or more indicated replacement software blocks; receiving, by the computing machine, a user selection of a set of replacement software blocks for a particular subregion; updating, by the computing machine and in response to the user selection, the one or more replacement vulnerability metrics for the particular subregion to reflect vulnerabilities associated with the selected replacement software block, and the second aggregate metric to reflect the updated one or more replacement vulnerability metrics; and displaying, by the computing machine, a severity breakdown of the vulnerabilities associated with at least one of the first aggregate metric or the second aggregate metric.

In Example E59, the subject matter of Example E58 includes, generating, by the computing machine in response to a user input, an exportable report indicating the one or more original software blocks, the set of the replacement software blocks, vulnerability metrics of the one or more original software blocks, and vulnerability metrics of the set of the selected replacement software blocks.

In Example E60, the subject matter of Examples E58-E59 includes, the operations further comprising: identifying, by the computing machine, the one or more compatible replacement software blocks for an original software block of the one or more original software blocks by analyzing dependency relationships defined in a software bill of materials.

In Example E61, the subject matter of Examples E58-E60 includes, the operations further comprising: storing, by the computing machine, the user selection in a persistent data structure that maintains the selection across multiple user sessions.

In Example E62, the subject matter of Examples E58-E61 includes, wherein the severity breakdown comprises categorizing the vulnerabilities into a plurality of severity levels.

In Example E63, the subject matter of Examples E58-E62 includes, wherein: the first interface region comprises a first column having a first cell for a first original software block of the one or more original software blocks, the second interface region comprises a second column, having a second cell for a subregion corresponding to the first original software block, and the first cell and the second cell are in a same row for the first original software block.

In Example E64, the subject matter of Example E63 includes, wherein the second column is adjacent to the first column.

In Example E65, the subject matter of Examples E58-E64 includes, wherein the aggregate vulnerability metrics are displayed in a third interface region, wherein the third interface region is positioned above the first interface region and the second interface region.

In Example E66, the subject matter of Examples E58-E65 includes, wherein the aggregate vulnerability metrics are displayed in a third interface region, the operations further comprising: displaying, by the computing machine, a scroll bar for scrolling through the first interface region and the second interface region without scrolling through the third interface region.

In Example E67, the subject matter of Examples E58-E66 includes, wherein updating the one or more replacement vulnerability metrics and the second aggregate metric occurs in real-time in response to the user selection.

In Example E68, the subject matter of Examples E58-E67 includes, wherein the selection element comprises a pull-down menu displaying identifiers for each of the one or more compatible replacement software blocks.

In Example E69, the subject matter of Examples E58-E68 includes, the operations further comprising: displaying, by the computing machine, a control element for resetting the set of the replacement software blocks to their corresponding original software blocks; and updating, by the computing machine, the second aggregate metric in response to selection of the control element.

In Example E70, the subject matter of Examples E58-E69 includes, the operations further comprising: accessing, by the computing machine, a software application for analysis; identifying, by the computing machine, the one or more original software blocks through automated image scanning of the software application; generating a software bill of materials based on the one or more original software blocks, wherein the software bill of materials comprises a data structure mapping relationships between the one or more original software blocks; calculating the one or more original vulnerability metrics by: identifying, for each original software block, vulnerabilities associated with a specific version of the original software block, and determining the first aggregate metric based on the identified vulnerabilities; identifying the one or more compatible replacement software blocks based on: querying one or more software repositories for stored patches, and verifying compatibility between the stored patches and the one or more original software blocks based on the mapped relationships in the software bill of materials; and calculating the one or more replacement vulnerability metrics based on vulnerability remediations provided by the one or more compatible replacement software blocks.

In Example E71, the subject matter of Examples E58-E70 includes, the operations further comprising: displaying, by the computing machine, an additional interface region comprising one or more additional subregions corresponding to the one or more original software blocks, wherein: each additional subregion comprises a second element for indicating one or more second replacement software blocks from the one or more compatible replacement software blocks, and one or more second replacement vulnerability metrics associated with the one or more indicated second replacement software blocks, the selection of the second replacement software blocks in the additional interface region is independent from the selection of replacement software blocks in the second interface region, and the second aggregate metric is separately calculated and displayed for each of the second interface region and the additional interface region; and displaying, by the computing machine, a control element for adding another interface region for selecting other replacement software blocks.

In Example E72, the subject matter of Examples E58-E71 includes, the operations further comprising: determining, by the computing machine, a priority score corresponding to a given original software block being replaced by a given replacement software block, wherein determining the priority score comprises: calculating an exploitability metric based on: one or more of current vulnerability exploit data associated with the given replacement software block, and predicted future exploit probability data associated with the given replacement software block, calculating an impact metric based on contextual data associated with the given original software block, and determining the priority score based on a combination of the exploitability metric and the impact metric.

In Example E73, the subject matter of Example E72 includes, the operations further comprising: displaying, by the computing machine and within each subregion of the second interface region, the one or more compatible replacement software blocks in an order based on their respective priority scores.

In Example E74, the subject matter of Examples E58-E73 includes, the operations further comprising: determining, by the computing machine, an original software block priority score for a first original software block, wherein determining the original software block priority score comprises: calculating an original exploitability metric based on one or more of: current vulnerability exploit data associated with the first original software block, and predicted future exploit probability data associated with the first original software block, analyzing availability of compatible replacement software blocks for the first original software block, calculating an original impact metric based on contextual data associated with the first original software block, and determining the original software block priority score based on a combination of the original exploitability metric, the availability of compatible replacement software blocks, and the original impact metric.

In Example E75, the subject matter of Example E74 includes, the operations further comprising: displaying, by the computing machine and in the first interface region, the indications of the one or more original software blocks in an order based on original software block priority scores determined for at least one of the one or more original software blocks, wherein the at least one of the one or more original software blocks include the first original software block, wherein the original software block priority scores include the original software block priority score for the first original software block.

Example E76 is a system for vulnerability management via user interface, the system comprising: processing circuitry; and a memory subsystem storing instructions which, when executed by the processing circuitry, cause the processing circuitry to perform operations comprising: displaying, by a computing machine, a first interface region comprising indications of one or more original software blocks and corresponding one or more original vulnerability metrics; displaying, by the computing machine, a second interface region comprising one or more subregions corresponding to the one or more original software blocks, wherein each subregion comprises: an element for indicating one or more replacement software blocks from one or more compatible replacement software blocks, and one or more replacement vulnerability metrics associated with the one or more indicated replacement software blocks; displaying, by the computing machine, aggregate vulnerability metrics comprising: a first aggregate metric representing a count of vulnerabilities across the one or more original software blocks, and a second aggregate metric representing a count of vulnerabilities across the one or more indicated replacement software blocks; receiving, by the computing machine, a user selection of a set of replacement software blocks for a particular subregion; updating, by the computing machine and in response to the user selection, the one or more replacement vulnerability metrics for the particular subregion to reflect vulnerabilities associated with the selected replacement software block, and the second aggregate metric to reflect the updated one or more replacement vulnerability metrics; and displaying, by the computing machine, a severity breakdown of the vulnerabilities associated with at least one of the first aggregate metric or the second aggregate metric.

In Example E77, the subject matter of Example E76 includes, generating, by the computing machine in response to a user input, an exportable report indicating the one or more original software blocks, the set of the replacement software blocks, vulnerability metrics of the one or more original software blocks, and vulnerability metrics of the set of the selected replacement software blocks.

In Example E78, the subject matter of Examples E76-E77 includes, the operations further comprising: identifying, by the computing machine, the one or more compatible replacement software blocks for an original software block of the one or more original software blocks by analyzing dependency relationships defined in a software bill of materials.

In Example E79, the subject matter of Examples E76-E78 includes, the operations further comprising: storing, by the computing machine, the user selection in a persistent data structure that maintains the selection across multiple user sessions.

In Example E80, the subject matter of Examples E76-E79 includes, wherein the severity breakdown comprises categorizing the vulnerabilities into a plurality of severity levels.

In Example E81, the subject matter of Examples E76-E80 includes, wherein: the first interface region comprises a first column having a first cell for a first original software block of the one or more original software blocks, the second interface region comprises a second column, having a second cell for a subregion corresponding to the first original software block, and the first cell and the second cell are in a same row for the first original software block.

In Example E82, the subject matter of Example E81 includes, wherein the second column is adjacent to the first column.

In Example E83, the subject matter of Examples E76-E82 includes, wherein the aggregate vulnerability metrics are displayed in a third interface region, wherein the third interface region is positioned above the first interface region and the second interface region.

In Example E84, the subject matter of Examples E76-E83 includes, wherein the aggregate vulnerability metrics are displayed in a third interface region, the operations further comprising: displaying, by the computing machine, a scroll bar for scrolling through the first interface region and the second interface region without scrolling through the third interface region.

In Example E85, the subject matter of Examples E76-E84 includes, wherein updating the one or more replacement vulnerability metrics and the second aggregate metric occurs in real-time in response to the user selection.

In Example E86, the subject matter of Examples E76-E85 includes, wherein the selection element comprises a pull-down menu displaying identifiers for each of the one or more compatible replacement software blocks.

In Example E87, the subject matter of Examples E76-E86 includes, the operations further comprising: displaying, by the computing machine, a control element for resetting the set of the replacement software blocks to their corresponding original software blocks; and updating, by the computing machine, the second aggregate metric in response to selection of the control element.

In Example E88, the subject matter of Examples E76-E87 includes, the operations further comprising: accessing, by the computing machine, a software application for analysis; identifying, by the computing machine, the one or more original software blocks through automated image scanning of the software application; generating a software bill of materials based on the one or more original software blocks, wherein the software bill of materials comprises a data structure mapping relationships between the one or more original software blocks; calculating the one or more original vulnerability metrics by: identifying, for each original software block, vulnerabilities associated with a specific version of the original software block, and determining the first aggregate metric based on the identified vulnerabilities; identifying the one or more compatible replacement software blocks based on: querying one or more software repositories for stored patches, and verifying compatibility between the stored patches and the one or more original software blocks based on the mapped relationships in the software bill of materials; and calculating the one or more replacement vulnerability metrics based on vulnerability remediations provided by the one or more compatible replacement software blocks.

In Example E89, the subject matter of Examples E76-E88 includes, the operations further comprising: displaying, by the computing machine, an additional interface region comprising one or more additional subregions corresponding to the one or more original software blocks, wherein: each additional subregion comprises a second element for indicating one or more second replacement software blocks from the one or more compatible replacement software blocks, and one or more second replacement vulnerability metrics associated with the one or more indicated second replacement software blocks, the selection of the second replacement software blocks in the additional interface region is independent from the selection of replacement software blocks in the second interface region, and the second aggregate metric is separately calculated and displayed for each of the second interface region and the additional interface region; and displaying, by the computing machine, a control element for adding another interface region for selecting other replacement software blocks.

In Example E90, the subject matter of Examples E76-E89 includes, the operations further comprising: determining, by the computing machine, a priority score corresponding to a given original software block being replaced by a given replacement software block, wherein determining the priority score comprises: calculating an exploitability metric based on: one or more of current vulnerability exploit data associated with the given replacement software block, and predicted future exploit probability data associated with the given replacement software block, calculating an impact metric based on contextual data associated with the given original software block, and determining the priority score based on a combination of the exploitability metric and the impact metric.

In Example E91, the subject matter of Example E90 includes, the operations further comprising: displaying, by the computing machine and within each subregion of the second interface region, the one or more compatible replacement software blocks in an order based on their respective priority scores.

In Example E92, the subject matter of Examples E76-E91 includes, the operations further comprising: determining, by the computing machine, an original software block priority score for a first original software block, wherein determining the original software block priority score comprises: calculating an original exploitability metric based on one or more of: current vulnerability exploit data associated with the first original software block, and predicted future exploit probability data associated with the first original software block, analyzing availability of compatible replacement software blocks for the first original software block, calculating an original impact metric based on contextual data associated with the first original software block, and determining the original software block priority score based on a combination of the original exploitability metric, the availability of compatible replacement software blocks, and the original impact metric.

In Example E93, the subject matter of Example E92 includes, the operations further comprising: displaying, by the computing machine and in the first interface region, the indications of the one or more original software blocks in an order based on original software block priority scores determined for at least one of the one or more original software blocks, wherein the at least one of the one or more original software blocks include the first original software block, wherein the original software block priority scores include the original software block priority score for the first original software block.

Example E94 is a computer-implemented method for vulnerability management via a user interface, the method comprising: displaying, by a computing machine, a first interface region comprising indications of one or more original software blocks and corresponding one or more original vulnerability metrics; displaying, by the computing machine, a second interface region comprising one or more subregions corresponding to the one or more original software blocks, wherein each subregion comprises: an element for indicating one or more replacement software blocks from one or more compatible replacement software blocks, and one or more replacement vulnerability metrics associated with the one or more indicated replacement software blocks; displaying, by the computing machine, aggregate vulnerability metrics comprising: a first aggregate metric representing a count of vulnerabilities across the one or more original software blocks, and a second aggregate metric representing a count of vulnerabilities across the one or more indicated replacement software blocks across the one or more subregions; receiving, by the computing machine, a user selection of a set of replacement software blocks for a particular subregion; updating, by the computing machine and in response to the user selection, the one or more replacement vulnerability metrics for the particular subregion to reflect vulnerabilities associated with the selected set of the replacement software blocks, and the second aggregate metric to reflect the updated one or more replacement vulnerability metrics; and displaying, by the computing machine, a severity breakdown of the vulnerabilities associated with at least one of the first aggregate metric or the second aggregate metric.

In Example E95, the subject matter of Example E94 includes, the operations further comprising: generating, by the computing machine in response to a user input, an exportable report indicating at least the one or more original software blocks, the selected set of the replacement software blocks across the one or more subregions, vulnerability metrics of the one or more original software blocks, and vulnerability metrics of the selected set of the replacement software blocks across the one or more subregions.

In Example E96, the subject matter of Examples E94-E95 includes, the operations further comprising: identifying, by the computing machine, the one or more compatible replacement software blocks for an original software block of the one or more original software blocks by analyzing dependency relationships defined in a software bill of materials.

In Example E97, the subject matter of Examples E94-E96 includes, the operations further comprising: storing, by the computing machine, the user selection in a persistent data structure that maintains the selection across multiple user sessions.

In Example E98, the subject matter of Examples E94-E97 includes, wherein the severity breakdown comprises categorizing the vulnerabilities into a plurality of severity levels.

In Example E99, the subject matter of Examples E94-E98 includes, wherein: the first interface region comprises a first column having a first cell for a first original software block of the one or more original software blocks, the second interface region comprises a second column, having a second cell for a subregion corresponding to the first original software block, and the first cell and the second cell are in a same row for the first original software block.

In Example E100, the subject matter of Example E99 includes, wherein the second column is adjacent to the first column.

In Example E101, the subject matter of Examples E94-E100 includes, wherein the aggregate vulnerability metrics are displayed in a third interface region, wherein the third interface region is positioned above the first interface region and the second interface region.

In Example E102, the subject matter of Examples E94-E101 includes, wherein the aggregate vulnerability metrics are displayed in a third interface region, the operations further comprising: displaying, by the computing machine, a scroll bar for scrolling through the first interface region and the second interface region without scrolling through the third interface region.

In Example E103, the subject matter of Examples E94-E102 includes, wherein updating the one or more replacement vulnerability metrics and the second aggregate metric occurs in real-time in response to the user selection.

In Example E104, the subject matter of Examples E94-E103 includes, wherein a user interface element for receiving the selection comprises a pull-down menu displaying identifiers for each of the one or more compatible replacement software blocks.

In Example E105, the subject matter of Examples E94-E104 includes, the operations further comprising: displaying, by the computing machine, a control element for resetting the set of the replacement software blocks across the one or more subregions to their corresponding original software blocks; and updating, by the computing machine, the second aggregate metric in response to selection of the control element.

In Example E106, the subject matter of Examples E94-E105 includes, the operations further comprising: accessing, by the computing machine, a software application for analysis; identifying, by the computing machine, the one or more original software blocks through automated image scanning of the software application; generating a software bill of materials based on the one or more original software blocks, wherein the software bill of materials comprises a data structure mapping relationships between the one or more original software blocks; calculating the one or more original vulnerability metrics by: identifying, for each original software block, vulnerabilities associated with a specific version of the original software block, and determining the first aggregate metric based on the identified vulnerabilities; identifying the one or more compatible replacement software blocks based on: querying one or more software repositories for stored patches, and verifying compatibility between the stored patches and the one or more original software blocks based on the mapped relationships in the software bill of materials; and calculating the one or more replacement vulnerability metrics based on vulnerability remediations provided by the one or more compatible replacement software blocks.

In Example E107, the subject matter of Examples E94-E106 includes, the operations further comprising: displaying, by the computing machine, an additional interface region comprising one or more additional subregions, each additional subregion corresponding to a respective subregion of the one or more subregions of the second interface region and corresponding to a same original software block as the respective subregion of the second interface region, wherein: each additional subregion comprises a second element for indicating one or more second replacement software blocks from the one or more compatible replacement software blocks, and one or more second replacement vulnerability metrics associated with the one or more indicated second replacement software blocks, the one or more second replacement software blocks indicated in a respective additional subregion are independent from the one or more replacement software blocks indicated in the corresponding respective subregion of the second interface region, and the second aggregate metric is separately calculated and displayed for each of the second interface region and the additional interface region; and displaying, by the computing machine, a control element for adding another interface region for selecting other replacement software blocks.

In Example E108, the subject matter of Examples E94-E107 includes, the operations further comprising: determining, by the computing machine, a priority score corresponding to a given original software block being replaced by a given set of replacement software blocks, wherein determining the priority score comprises: calculating an exploitability metric based on: one or more of current vulnerability exploit data associated with the given set of the replacement software blocks, and predicted future exploit probability data associated with the given set of the replacement software blocks, calculating an impact metric based on contextual data associated with the given original software block, and determining the priority score based on at least one of the exploitability metric or the impact metric.

In Example E109, the subject matter of Example E108 includes, the operations further comprising: displaying, by the computing machine and within each subregion of the second interface region, the one or more compatible replacement software blocks in an order based on their respective priority scores.

In Example E110, the subject matter of Examples E94-E109 includes, the operations further comprising: determining, by the computing machine, an original software block priority score for a first original software block, wherein determining the original software block priority score comprises: calculating an original exploitability metric based on one or more of: current vulnerability exploit data associated with the first original software block, and predicted future exploit probability data associated with the first original software block, analyzing availability of compatible replacement software blocks for the first original software block, calculating an original impact metric based on contextual data associated with the first original software block, and determining the original software block priority score based on at least one of the original exploitability metric, the availability of compatible replacement software blocks, or the original impact metric.

In Example E111, the subject matter of Example E110 includes, the operations further comprising: displaying, by the computing machine and in the first interface region, the indications of the one or more original software blocks in an order based on original software block priority scores determined for at least one of the one or more original software blocks, wherein the at least one of the one or more original software blocks include the first original software block, wherein the original software block priority scores include the original software block priority score for the first original software block.

Example E112 is a computer-readable medium for vulnerability management via a user interface, the computer-readable medium storing instructions which, when executed by processing circuitry, cause the processing circuitry to perform operations comprising: displaying, by a computing machine, a first interface region comprising indications of one or more original software blocks and corresponding one or more original vulnerability metrics; displaying, by the computing machine, a second interface region comprising one or more subregions corresponding to the one or more original software blocks, wherein each subregion comprises: an element for indicating one or more replacement software blocks from one or more compatible replacement software blocks, and one or more replacement vulnerability metrics associated with the one or more indicated replacement software blocks; displaying, by the computing machine, aggregate vulnerability metrics comprising: a first aggregate metric representing a count of vulnerabilities across the one or more original software blocks, and a second aggregate metric representing a count of vulnerabilities across the one or more indicated replacement software blocks across the one or more subregions; receiving, by the computing machine, a user selection of a set of replacement software blocks for a particular subregion; updating, by the computing machine and in response to the user selection, the one or more replacement vulnerability metrics for the particular subregion to reflect vulnerabilities associated with the selected set of the replacement software blocks, and the second aggregate metric to reflect the updated one or more replacement vulnerability metrics; and displaying, by the computing machine, a severity breakdown of the vulnerabilities associated with at least one of the first aggregate metric or the second aggregate metric.

In Example E113, the subject matter of Example E112 includes, the operations further comprising: generating, by the computing machine in response to a user input, an exportable report indicating at least the one or more original software blocks, the selected set of the replacement software blocks across the one or more subregions, vulnerability metrics of the one or more original software blocks, and vulnerability metrics of the selected set of the replacement software blocks across the one or more subregions.

In Example E114, the subject matter of Examples E112-E113 includes, the operations further comprising: identifying, by the computing machine, the one or more compatible replacement software blocks for an original software block of the one or more original software blocks by analyzing dependency relationships defined in a software bill of materials.

In Example E115, the subject matter of Examples E112-E114 includes, the operations further comprising: storing, by the computing machine, the user selection in a persistent data structure that maintains the selection across multiple user sessions.

In Example E116, the subject matter of Examples E112-E115 includes, wherein the severity breakdown comprises categorizing the vulnerabilities into a plurality of severity levels.

In Example E117, the subject matter of Examples E112-E116 includes, wherein: the first interface region comprises a first column having a first cell for a first original software block of the one or more original software blocks, the second interface region comprises a second column, having a second cell for a subregion corresponding to the first original software block, and the first cell and the second cell are in a same row for the first original software block.

In Example E118, the subject matter of Example E117 includes, wherein the second column is adjacent to the first column.

In Example E119, the subject matter of Examples E112-E118 includes, wherein the aggregate vulnerability metrics are displayed in a third interface region, wherein the third interface region is positioned above the first interface region and the second interface region.

In Example E120, the subject matter of Examples E112-E119 includes, wherein the aggregate vulnerability metrics are displayed in a third interface region, the operations further comprising: displaying, by the computing machine, a scroll bar for scrolling through the first interface region and the second interface region without scrolling through the third interface region.

In Example E121, the subject matter of Examples E112-E120 includes, wherein updating the one or more replacement vulnerability metrics and the second aggregate metric occurs in real-time in response to the user selection.

In Example E122, the subject matter of Examples E112-E121 includes, wherein a user interface element for receiving the selection comprises a pull-down menu displaying identifiers for each of the one or more compatible replacement software blocks.

In Example E123, the subject matter of Examples E112-E122 includes, the operations further comprising: displaying, by the computing machine, a control element for resetting the set of the replacement software blocks across the one or more subregions to their corresponding original software blocks; and updating, by the computing machine, the second aggregate metric in response to selection of the control element.

In Example E124, the subject matter of Examples E112-E123 includes, the operations further comprising: accessing, by the computing machine, a software application for analysis; identifying, by the computing machine, the one or more original software blocks through automated image scanning of the software application; generating a software bill of materials based on the one or more original software blocks, wherein the software bill of materials comprises a data structure mapping relationships between the one or more original software blocks; calculating the one or more original vulnerability metrics by: identifying, for each original software block, vulnerabilities associated with a specific version of the original software block, and determining the first aggregate metric based on the identified vulnerabilities; identifying the one or more compatible replacement software blocks based on: querying one or more software repositories for stored patches, and verifying compatibility between the stored patches and the one or more original software blocks based on the mapped relationships in the software bill of materials; and calculating the one or more replacement vulnerability metrics based on vulnerability remediations provided by the one or more compatible replacement software blocks.

In Example E125, the subject matter of Examples E112-E124 includes, the operations further comprising: displaying, by the computing machine, an additional interface region comprising one or more additional subregions, each additional subregion corresponding to a respective subregion of the one or more subregions of the second interface region and corresponding to a same original software block as the respective subregion of the second interface region, wherein: each additional subregion comprises a second element for indicating one or more second replacement software blocks from the one or more compatible replacement software blocks, and one or more second replacement vulnerability metrics associated with the one or more indicated second replacement software blocks, the one or more second replacement software blocks indicated in a respective additional subregion are independent from the one or more replacement software blocks indicated in the corresponding respective subregion of the second interface region, and the second aggregate metric is separately calculated and displayed for each of the second interface region and the additional interface region; and displaying, by the computing machine, a control element for adding another interface region for selecting other replacement software blocks.

In Example E126, the subject matter of Examples E112-E125 includes, the operations further comprising: determining, by the computing machine, a priority score corresponding to a given original software block being replaced by a given set of replacement software blocks, wherein determining the priority score comprises: calculating an exploitability metric based on: one or more of current vulnerability exploit data associated with the given set of the replacement software blocks, and predicted future exploit probability data associated with the given set of the replacement software blocks, calculating an impact metric based on contextual data associated with the given original software block, and determining the priority score based on at least one of the exploitability metric or the impact metric.

In Example E127, the subject matter of Example E126 includes, the operations further comprising: displaying, by the computing machine and within each subregion of the second interface region, the one or more compatible replacement software blocks in an order based on their respective priority scores.

In Example E128, the subject matter of Examples E112-E127 includes, the operations further comprising: determining, by the computing machine, an original software block priority score for a first original software block, wherein determining the original software block priority score comprises: calculating an original exploitability metric based on one or more of: current vulnerability exploit data associated with the first original software block, and predicted future exploit probability data associated with the first original software block, analyzing availability of compatible replacement software blocks for the first original software block, calculating an original impact metric based on contextual data associated with the first original software block, and determining the original software block priority score based on at least one of the original exploitability metric, the availability of compatible replacement software blocks, or the original impact metric.

In Example E129, the subject matter of Example E128 includes, the operations further comprising: displaying, by the computing machine and in the first interface region, the indications of the one or more original software blocks in an order based on original software block priority scores determined for at least one of the one or more original software blocks, wherein the at least one of the one or more original software blocks include the first original software block, wherein the original software block priority scores include the original software block priority score for the first original software block.

Example E130 is a system for vulnerability management via a user interface, the system comprising: processing circuitry; and a memory subsystem storing instructions which, when executed by the processing circuitry, cause the processing circuitry to perform operations comprising: displaying, by a computing machine, a first interface region comprising indications of one or more original software blocks and corresponding one or more original vulnerability metrics; displaying, by the computing machine, a second interface region comprising one or more subregions corresponding to the one or more original software blocks, wherein each subregion comprises: an element for indicating one or more replacement software blocks from one or more compatible replacement software blocks, and one or more replacement vulnerability metrics associated with the one or more indicated replacement software blocks; displaying, by the computing machine, aggregate vulnerability metrics comprising: a first aggregate metric representing a count of vulnerabilities across the one or more original software blocks, and a second aggregate metric representing a count of vulnerabilities across the one or more indicated replacement software blocks across the one or more subregions; receiving, by the computing machine, a user selection of a set of replacement software blocks for a particular subregion; updating, by the computing machine and in response to the user selection, the one or more replacement vulnerability metrics for the particular subregion to reflect vulnerabilities associated with the selected set of the replacement software blocks, and the second aggregate metric to reflect the updated one or more replacement vulnerability metrics; and displaying, by the computing machine, a severity breakdown of the vulnerabilities associated with at least one of the first aggregate metric or the second aggregate metric.

In Example E131, the subject matter of Example E130 includes, the operations further comprising: generating, by the computing machine in response to a user input, an exportable report indicating at least the one or more original software blocks, the selected set of the replacement software blocks across the one or more subregions, vulnerability metrics of the one or more original software blocks, and vulnerability metrics of the selected set of the replacement software blocks across the one or more subregions.

In Example E132, the subject matter of Examples E130-E131 includes, the operations further comprising: identifying, by the computing machine, the one or more compatible replacement software blocks for an original software block of the one or more original software blocks by analyzing dependency relationships defined in a software bill of materials.

In Example E133, the subject matter of Examples E130-E132 includes, the operations further comprising: storing, by the computing machine, the user selection in a persistent data structure that maintains the selection across multiple user sessions.

In Example E134, the subject matter of Examples E130-E133 includes, wherein the severity breakdown comprises categorizing the vulnerabilities into a plurality of severity levels.

In Example E135, the subject matter of Examples E130-E134 includes, wherein: the first interface region comprises a first column having a first cell for a first original software block of the one or more original software blocks, the second interface region comprises a second column, having a second cell for a subregion corresponding to the first original software block, and the first cell and the second cell are in a same row for the first original software block.

In Example E136, the subject matter of Example E135 includes, wherein the second column is adjacent to the first column.

In Example E137, the subject matter of Examples E130-E136 includes, wherein the aggregate vulnerability metrics are displayed in a third interface region, wherein the third interface region is positioned above the first interface region and the second interface region.

In Example E138, the subject matter of Examples E130-E137 includes, wherein the aggregate vulnerability metrics are displayed in a third interface region, the operations further comprising: displaying, by the computing machine, a scroll bar for scrolling through the first interface region and the second interface region without scrolling through the third interface region.

In Example E139, the subject matter of Examples E130-E138 includes, wherein updating the one or more replacement vulnerability metrics and the second aggregate metric occurs in real-time in response to the user selection.

In Example E140, the subject matter of Examples E130-E139 includes, wherein a user interface element for receiving the selection comprises a pull-down menu displaying identifiers for each of the one or more compatible replacement software blocks.

In Example E141, the subject matter of Examples E130-E140 includes, the operations further comprising: displaying, by the computing machine, a control element for resetting the set of the replacement software blocks across the one or more subregions to their corresponding original software blocks; and updating, by the computing machine, the second aggregate metric in response to selection of the control element.

In Example E142, the subject matter of Examples E130-E141 includes, the operations further comprising: accessing, by the computing machine, a software application for analysis; identifying, by the computing machine, the one or more original software blocks through automated image scanning of the software application; generating a software bill of materials based on the one or more original software blocks, wherein the software bill of materials comprises a data structure mapping relationships between the one or more original software blocks; calculating the one or more original vulnerability metrics by: identifying, for each original software block, vulnerabilities associated with a specific version of the original software block, and determining the first aggregate metric based on the identified vulnerabilities; identifying the one or more compatible replacement software blocks based on: querying one or more software repositories for stored patches, and verifying compatibility between the stored patches and the one or more original software blocks based on the mapped relationships in the software bill of materials; and calculating the one or more replacement vulnerability metrics based on vulnerability remediations provided by the one or more compatible replacement software blocks.

In Example E143, the subject matter of Examples E130-E142 includes, the operations further comprising: displaying, by the computing machine, an additional interface region comprising one or more additional subregions, each additional subregion corresponding to a respective subregion of the one or more subregions of the second interface region and corresponding to a same original software block as the respective subregion of the second interface region, wherein: each additional subregion comprises a second element for indicating one or more second replacement software blocks from the one or more compatible replacement software blocks, and one or more second replacement vulnerability metrics associated with the one or more indicated second replacement software blocks, the one or more second replacement software blocks indicated in a respective additional subregion are independent from the one or more replacement software blocks indicated in the corresponding respective subregion of the second interface region, and the second aggregate metric is separately calculated and displayed for each of the second interface region and the additional interface region; and displaying, by the computing machine, a control element for adding another interface region for selecting other replacement software blocks.

In Example E144, the subject matter of Examples E130-E143 includes, the operations further comprising: determining, by the computing machine, a priority score corresponding to a given original software block being replaced by a given set of replacement software blocks, wherein determining the priority score comprises: calculating an exploitability metric based on: one or more of current vulnerability exploit data associated with the given set of the replacement software blocks, and predicted future exploit probability data associated with the given set of the replacement software blocks, calculating an impact metric based on contextual data associated with the given original software block, and determining the priority score based on at least one of the exploitability metric or the impact metric.

In Example E145, the subject matter of Example E144 includes, the operations further comprising: displaying, by the computing machine and within each subregion of the second interface region, the one or more compatible replacement software blocks in an order based on their respective priority scores.

In Example E146, the subject matter of Examples E130-E145 includes, the operations further comprising: determining, by the computing machine, an original software block priority score for a first original software block, wherein determining the original software block priority score comprises: calculating an original exploitability metric based on one or more of: current vulnerability exploit data associated with the first original software block, and predicted future exploit probability data associated with the first original software block, analyzing availability of compatible replacement software blocks for the first original software block, calculating an original impact metric based on contextual data associated with the first original software block, and determining the original software block priority score based on at least one of the original exploitability metric, the availability of compatible replacement software blocks, or the original impact metric.

In Example E147, the subject matter of Example E146 includes, the operations further comprising: displaying, by the computing machine and in the first interface region, the indications of the one or more original software blocks in an order based on original software block priority scores determined for at least one of the one or more original software blocks, wherein the at least one of the one or more original software blocks include the first original software block, wherein the original software block priority scores include the original software block priority score for the first original software block.

Example E148 is at least one machine-readable medium including instructions that, when executed by processing circuitry, cause the processing circuitry to perform operations to implement any of Examples E1-E147.

Example E149 is an apparatus comprising means to implement any of Examples E1-E147.

Example E150 is a system to implement any of Examples E1-E147.

Example E151 is a method to implement any of Examples E1-E147.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72 (b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method for vulnerability management via a user interface, the method comprising:

displaying, by a computing machine, a first interface region comprising indications of one or more original software blocks and corresponding one or more original vulnerability metrics;

displaying, by the computing machine, a second interface region comprising one or more subregions corresponding to the one or more original software blocks, wherein each subregion comprises: an element for indicating one or more replacement software blocks from one or more compatible replacement software blocks, and one or more replacement vulnerability metrics associated with the one or more indicated replacement software blocks;

displaying, by the computing machine, aggregate vulnerability metrics comprising: a first aggregate metric representing a count of vulnerabilities across the one or more original software blocks, and a second aggregate metric representing a count of vulnerabilities across the one or more indicated replacement software blocks across the one or more subregions;

receiving, by the computing machine, a user selection of a set of replacement software blocks for a particular subregion;

updating, by the computing machine and in response to the user selection, the one or more replacement vulnerability metrics for the particular subregion to reflect vulnerabilities associated with the selected set of the replacement software blocks, and the second aggregate metric to reflect the updated one or more replacement vulnerability metrics;

displaying, by the computing machine, a severity breakdown of the vulnerabilities associated with at least one of the first aggregate metric or the second aggregate metric;

displaying, by the computing machine, a control element for resetting the set of the replacement software blocks across the one or more subregions to their corresponding original software blocks; and updating, by the computing machine, the second aggregate metric in response to selection of the control element.

2. The method of claim 1, further comprising:

generating, by the computing machine in response to a user input, an exportable report indicating at least the one or more original software blocks, the selected set of the replacement software blocks across the one or more subregions, vulnerability metrics of the one or more original software blocks, and vulnerability metrics of the selected set of the replacement software blocks across the one or more subregions.

3. The method of claim 1, further comprising:

storing, by the computing machine, the user selection in a persistent data structure that maintains the selection across multiple user sessions.

4. The method of claim 1, further comprising:

determining, by the computing machine, a priority score corresponding to a given original software block being replaced by a given set of replacement software blocks, wherein determining the priority score comprises:

calculating an exploitability metric based on: one or more of current vulnerability exploit data associated with the given set of the replacement software blocks, and predicted future exploit probability data associated with the given set of the replacement software blocks, calculating an impact metric based on contextual data associated with the given original software block, and determining the priority score based on at least one of the exploitability metric or the impact metric.

5. The method of claim 1, further comprising:

determining, by the computing machine, an original software block priority score for a first original software block, wherein determining the original software block priority score comprises:

calculating an original exploitability metric based on one or more of: current vulnerability exploit data associated with the first original software block, and predicted future exploit probability data associated with the first original software block, analyzing availability of compatible replacement software blocks for the first original software block, calculating an original impact metric based on contextual data associated with the first original software block, and determining the original software block priority score based on at least one of the original exploitability metric, the availability of compatible replacement software blocks, or the original impact metric.

6. A non-transitory computer-readable medium for vulnerability management via a user interface, the computer-readable medium storing instructions which, when executed by processing circuitry, cause the processing circuitry to perform operations comprising:

displaying, by a computing machine, a first interface region comprising indications of one or more original software blocks and corresponding one or more original vulnerability metrics;

displaying, by the computing machine, a second interface region comprising one or more subregions corresponding to the one or more original software blocks, wherein each subregion comprises: an element for indicating one or more replacement software blocks from one or more compatible replacement software blocks, and one or more replacement vulnerability metrics associated with the one or more indicated replacement software blocks;

displaying, by the computing machine, aggregate vulnerability metrics comprising: a first aggregate metric representing a count of vulnerabilities across the one or more original software blocks, and a second aggregate metric representing a count of vulnerabilities across the one or more indicated replacement software blocks across the one or more subregions;

receiving, by the computing machine, a user selection of a set of replacement software blocks for a particular subregion;

updating, by the computing machine and in response to the user selection, the one or more replacement vulnerability metrics for the particular subregion to reflect vulnerabilities associated with the selected set of the replacement software blocks, and the second aggregate metric to reflect the updated one or more replacement vulnerability metrics;

displaying, by the computing machine, a severity breakdown of the vulnerabilities associated with at least one of the first aggregate metric or the second aggregate metric;

displaying, by the computing machine, a control element for resetting the set of the replacement software blocks across the one or more subregions to their corresponding original software blocks; and updating, by the computing machine, the second aggregate metric in response to selection of the control element.

7. The non-transitory computer-readable medium of claim 6, the operations further comprising:

generating, by the computing machine in response to a user input, an exportable report indicating at least the one or more original software blocks, the selected set of the replacement software blocks across the one or more subregions, vulnerability metrics of the one or more original software blocks, and vulnerability metrics of the selected set of the replacement software blocks across the one or more subregions.

8. The non-transitory computer-readable medium of claim 6, the operations further comprising:

identifying, by the computing machine, the one or more compatible replacement software blocks for an original software block of the one or more original software blocks by analyzing dependency relationships defined in a software bill of materials.

9. The non-transitory computer-readable medium of claim 6, the operations further comprising:

storing, by the computing machine, the user selection in a persistent data structure that maintains the selection across multiple user sessions.

10. The non-transitory computer-readable medium of claim 6, wherein the severity breakdown comprises categorizing the vulnerabilities into a plurality of severity levels.

11. The non-transitory computer-readable medium of claim 6, wherein:

the first interface region comprises a first column having a first cell for a first original software block of the one or more original software blocks, the second interface region comprises a second column, having a second cell for a subregion corresponding to the first original software block, and the first cell and the second cell are in a same row for the first original software block.

12. The non-transitory computer-readable medium of claim 11, wherein the second column is adjacent to the first column.

13. The non-transitory computer-readable medium of claim 6, wherein the aggregate vulnerability metrics are displayed in a third interface region, wherein the third interface region is positioned above the first interface region and the second interface region.

14. The non-transitory computer-readable medium of claim 6, wherein the aggregate vulnerability metrics are displayed in a third interface region, the operations further comprising:

displaying, by the computing machine, a scroll bar for scrolling through the first interface region and the second interface region without scrolling through the third interface region.

15. The non-transitory computer-readable medium of claim 6, wherein updating the one or more replacement vulnerability metrics and the second aggregate metric occurs in real-time in response to the user selection.

16. The non-transitory computer-readable medium of claim 6, wherein a user interface element for receiving the selection comprises a pull-down menu displaying identifiers for each of the one or more compatible replacement software blocks.

17. The non-transitory computer-readable medium of claim 6, the operations further comprising:

accessing, by the computing machine, a software application for analysis;

identifying, by the computing machine, the one or more original software blocks through automated image scanning of the software application;

generating a software bill of materials based on the one or more original software blocks, wherein the software bill of materials comprises a data structure mapping relationships between the one or more original software blocks;

calculating the one or more original vulnerability metrics by:

identifying, for each original software block, vulner-
abilities associated with a specific version of the
original software block, and
determining the first aggregate metric based on the
identified vulnerabilities;
identifying the one or more compatible replacement soft-
ware blocks based on:
querying one or more software repositories for stored
patches, and
verifying compatibility between the stored patches and
the one or more original software blocks based on
the mapped relationships in the software bill of
materials; and
calculating the one or more replacement vulnerability
metrics based on vulnerability remediations provided
by the one or more compatible replacement software
blocks.

18. The non-transitory computer-readable medium of
claim 6, the operations further comprising:
displaying, by the computing machine, an additional
interface region comprising one or more additional
subregions, each additional subregion corresponding to
a respective subregion of the one or more subregions of
the second interface region and corresponding to a
same original software block as the respective subre-
gion of the second interface region, wherein:
each additional subregion comprises a second element
for indicating one or more second replacement soft-
ware blocks from the one or more compatible
replacement software blocks, and one or more sec-
ond replacement vulnerability metrics associated
with the one or more indicated second replacement
software blocks,
the one or more second replacement software blocks
indicated in a respective additional subregion are
independent from the one or more replacement soft-
ware blocks indicated in the corresponding respec-
tive subregion of the second interface region, and the
second aggregate metric is separately calculated and
displayed for each of the second interface region and
the additional interface region; and
displaying, by the computing machine, a second con-
trol element for adding another interface region for
selecting other replacement software blocks.

19. The non-transitory computer-readable medium of
claim 6, the operations further comprising:
determining, by the computing machine, a priority score
corresponding to a given original software block being
replaced by a given set of replacement software blocks,
wherein determining the priority score comprises:
calculating an exploitability metric based on: one or
more of current vulnerability exploit data associated
with the given set of the replacement software
blocks, and predicted future exploit probability data
associated with the given set of the replacement
software blocks,
calculating an impact metric based on contextual data
associated with the given original software block,
and
determining the priority score based on at least one of
the exploitability metric or the impact metric.

20. The non-transitory computer-readable medium of
claim 19, the operations further comprising:
displaying, by the computing machine and within each
subregion of the second interface region, the one or
more compatible replacement software blocks in an
order based on their respective priority scores.

21. The non-transitory computer-readable medium of
claim 6, the operations further comprising:
determining, by the computing machine, an original soft-
ware block priority score for a first original software
block, wherein determining the original software block
priority score comprises:
calculating an original exploitability metric based on
one or more of: current vulnerability exploit data
associated with the first original software block, and
predicted future exploit probability data associated
with the first original software block,
analyzing availability of compatible replacement soft-
ware blocks for the first original software block,
calculating an original impact metric based on contex-
tual data associated with the first original software
block, and
determining the original software block priority score
based on at least one of the original exploitability
metric, the availability of compatible replacement
software blocks, or the original impact metric.

22. The non-transitory computer-readable medium of
claim 21, the operations further comprising:
displaying, by the computing machine and in the first
interface region, the indications of the one or more
original software blocks in an order based on original
software block priority scores determined for at least
one of the one or more original software blocks,
wherein the at least one of the one or more original
software blocks include the first original software
block, wherein the original software block priority
scores include the original software block priority score
for the first original software block.

23. A system for vulnerability management via a user
interface, the system comprising:
processing circuitry; and
a memory subsystem storing instructions which, when
executed by the processing circuitry, cause the process-
ing circuitry to perform operations comprising:
displaying, by a computing machine, a first interface
region comprising indications of one or more origi-
nal software blocks and corresponding one or more
original vulnerability metrics;
displaying, by the computing machine, a second inter-
face region comprising one or more subregions cor-
responding to the one or more original software
blocks, wherein each subregion comprises: an ele-
ment for indicating one or more replacement soft-
ware blocks from one or more compatible replace-
ment software blocks, and one or more replacement
vulnerability metrics associated with the one or more
indicated replacement software blocks;
displaying, by the computing machine, aggregate vul-
nerability metrics comprising: a first aggregate met-
ric representing a count of vulnerabilities across the
one or more original software blocks, and a second
aggregate metric representing a count of vulnerabili-
ties across the one or more indicated replacement
software blocks across the one or more subregions;
receiving, by the computing machine, a user selection
of a set of replacement software blocks for a par-
ticular subregion;
updating, by the computing machine and in response to
the user selection, the one or more replacement
vulnerability metrics for the particular subregion to
reflect vulnerabilities associated with the selected set
of the replacement software blocks, and the second aggregate metric to reflect the updated one or more replacement vulnerability metrics;

displaying, by the computing machine, a severity breakdown of the vulnerabilities associated with at least one of the first aggregate metric or the second aggregate metric;

displaying, by the computing machine, a control element for resetting the set of the replacement software blocks across the one or more subregions to their corresponding original software blocks; and updating, by the computing machine, the second aggregate metric in response to selection of the control element.

24. The system of claim 23, wherein the aggregate vulnerability metrics are displayed in a third interface region, wherein the third interface region is positioned above the first interface region and the second interface region.

25. The system of claim 23, wherein updating the one or more replacement vulnerability metrics and the second aggregate metric occurs in real-time in response to the user selection.

26. The system of claim 23, wherein a user interface element for receiving the selection comprises a pull-down menu displaying identifiers for each of the one or more compatible replacement software blocks.

27. The system of claim 23, the operations further comprising:

accessing, by the computing machine, a software application for analysis;

identifying, by the computing machine, the one or more original software blocks through automated image scanning of the software application;

generating a software bill of materials based on the one or more original software blocks, wherein the software bill of materials comprises a data structure mapping relationships between the one or more original software blocks;

calculating the one or more original vulnerability metrics by:

identifying, for each original software block, vulnerabilities associated with a specific version of the original software block, and determining the first aggregate metric based on the identified vulnerabilities;

identifying the one or more compatible replacement software blocks based on:

querying one or more software repositories for stored patches, and verifying compatibility between the stored patches and the one or more original software blocks based on the mapped relationships in the software bill of materials; and calculating the one or more replacement vulnerability metrics based on vulnerability remediations provided by the one or more compatible replacement software blocks.

28. The system of claim 23, the operations further comprising:

displaying, by the computing machine, an additional interface region comprising one or more additional subregions, each additional subregion corresponding to a respective subregion of the one or more subregions of the second interface region and corresponding to a same original software block as the respective subregion of the second interface region, wherein:

each additional subregion comprises a second element for indicating one or more second replacement software blocks from the one or more compatible replacement software blocks, and one or more second replacement vulnerability metrics associated with the one or more indicated second replacement software blocks, the one or more second replacement software blocks indicated in a respective additional subregion are independent from the one or more replacement software blocks indicated in the corresponding respective subregion of the second interface region, and the second aggregate metric is separately calculated and displayed for each of the second interface region and the additional interface region; and displaying, by the computing machine, a second control element for adding another interface region for selecting other replacement software blocks.

29. The system of claim 23, the operations further comprising:

generating, by the computing machine in response to a user input, an exportable report indicating at least the one or more original software blocks, the selected set of the replacement software blocks across the one or more subregions, vulnerability metrics of the one or more original software blocks, and vulnerability metrics of the selected set of the replacement software blocks across the one or more subregions.

30. The system of claim 23, the operations further comprising:

storing, by the computing machine, the user selection in a persistent data structure that maintains the selection across multiple user sessions.

* * * * *